(12) United States Patent
Oliver et al.

(10) Patent No.: US 8,458,229 B2
(45) Date of Patent: Jun. 4, 2013

(54) METHOD AND SYSTEM FOR PROJECTING AND INJECTING INFORMATION SPACES

(75) Inventors: Ian Justin Oliver, Söderkulla (FI); Sergey Boldyrev, Söderkulla (FI)

(73) Assignee: Nokia Corporation, Espoo (FI)

( * ) Notice: Subject to any disclaimer, the term of this patent is extended or adjusted under 35 U.S.C. 154(b) by 402 days.

(21) Appl. No.: 12/603,319

(22) Filed: Oct. 21, 2009

(65) Prior Publication Data

US 2011/0093463 A1    Apr. 21, 2011

(51) Int. Cl.
*G06F 17/30*    (2006.01)

(52) U.S. Cl.
USPC ............................ 707/808; 707/802; 707/803

(58) Field of Classification Search
None
See application file for complete search history.

(56) References Cited

U.S. PATENT DOCUMENTS

| | | | |
|---|---|---|---|
| 6,442,570 B1 * | 8/2002 | Wu ............................ | 707/621 |
| 6,502,134 B1 * | 12/2002 | Makarios et al. ............. | 709/225 |
| 6,996,625 B2 * | 2/2006 | Kaplan et al. ................ | 709/231 |
| 7,519,546 B2 * | 4/2009 | Murren et al. ............. | 705/26.61 |
| 2005/0027687 A1 * | 2/2005 | Nowitz et al. ...................... | 707/3 |
| 2007/0271211 A1 | 11/2007 | Butcher et al. | |
| 2008/0301301 A1 * | 12/2008 | Palin et al. ..................... | 709/227 |
| 2009/0132474 A1 | 5/2009 | Ma et al. | |
| 2010/0036788 A1 | 2/2010 | Wu et al. | |

FOREIGN PATENT DOCUMENTS

WO    WO 0135211 A2 *    5/2001

OTHER PUBLICATIONS

Boldyrev et al, "A Mechanism for Managing and Distributing Information and Queries in a Smart Space Environment", Nov. 2009.*
Eemeli Kantola, "Synchronizing data between a social networking service and an RDF store via publish/subscribe", Master's Thesis, Jun., 2010.*
Oliver et al, "Dynamic, Localised Space Based Semantic Webs", 2008.*
Oliver et al, "Operations on Spaces of Information", IEEE, 2009.*
Balandin et al, Distributed Architecture of a Professional Social Network on top of M3 Smart Space Solution made in PCs and Mobile Devices Friendly Manner, IEEE, 2009.*
Petrovic et al, "G-ToPSS: Fast Fiterling of Graph-based Metadata", ACM, 2005.*
U.S. Appl. No. 12/474,576, filed May 29, 2009, Ian Justin Oliver.

(Continued)

*Primary Examiner* — Apu Mofiz
*Assistant Examiner* — Hung Le
(74) *Attorney, Agent, or Firm* — Ditthavong Mori & Steiner P.C.

(57) ABSTRACT

An approach is provided for managing projection and injection operations on information spaces with respect to their information content. An information space projection module receives a query to project a first information space from a second information space. In response to the query, the module extracts a subset of information content from the second information space by using a partitioning function. The module also extracts a subset of rules from the second information space by using the partitioning function. The module then creates the first information space using the extracted subset of information content, and the extracted subset of rules while maintains a link between the first and the second information spaces. An information space injection module enables further injection of the first information space back into the second information space.

10 Claims, 19 Drawing Sheets

OTHER PUBLICATIONS

Efficient Indices Using Graph Partitioning in RDF Triple Stores, Yan et al., IEEE Intl Conf on Data Engineering, Mar. 29-Apr. 2, 2009, pp. 1263-1266.

Operations on Spaces of Infomation, Oliver et al. Proceedings of the 2009 IEEE Intl Conf on Semantic Computing, 2009, pp. 267-274.

Query-Based Partitioning of Documents and Indexes for Information Lifecycle Management, Mitra et al., SIGMOD'08, Jun. 9-12, 2008, Canada, pp. 623-636.

Closed-World Databases and Circumscription, Lifschitz, Vladimir, Artificial Intelligence, 27, 1985, pp. 229-235.

Generative communication in Iinda, Gelernter, David, ACM Transactions on Programming Languages and Systems, 7(1), Jan. 1985. pp. 80-112.

Harvesting RDF triples, Futrelle, Joe, accessed: Jan. 14, 2011, http://www.ipaw.info/ipaw06/proceedings/CameraReady_s4_1.pdf, pp. 1-8.

Minimal Deductive Systems for RDF, Munoz, et al., accessed: Jan. 14, 2011, http://web.ing.puc.cl/~jperez/papers/minimal-rdf-camera-ready-ext.pdf, pp. 1-38.

Nonmonotonic Reasoning, Brewka et al., Handbook of Knowledge Representation, Edited by Harmelen, et.al., 2008 Elsevier B.V., pp. 239-284.

Possible Worlds Versioning, Mancilla et al., Math.comput.sci. 2 (2008), pp. 63-83.

Provenance and Annotation of Data, International Provenance and Annotation Workshop, IPAW 2006, Moreau et al. (Eds.), May 3-5, 2006, Springer, pp. 1-302.

A minimal triple space computing architecture, Bussler, Apr. 2005. Accessed: http://www.deri.ie/fileadmin/documents/Minimal_Tuple_Space_Architecture.pdf, pp. 1-32.

Collaborating software: Blackboard and multi-agent systems & the future, Corkill. Accessed: Aug. 18, 2010, http://dancorkill.home.comcast.net/~dancorkill/pubs/ilc03.pdf, pp. 1-12.

Culturesampo—a collective memory of finnish cultural heritage on the semantic web 2.0, Hyvonen et at. Access: Aug. 18, 2010, http://www.seco.tkk.fi/publications/2008/hyvonen-et-al-culturesampo-swc-2008.pdf, pp. 1-8.

Linked data spaces and data portability, Idehen, et al. Accessed: Aug. 18, 2010, http://events.linkeddata.org/ldow2008/papers/20-idehen-erling-linked-data-spaces.pdf, pp. 1-2.

Named graphs, provenance and trust, Carroll, et al., WWW 2005, May 10-14, 2005. Accessed: http://www2005.org/cdrom/docs/p613.pdf, pp. 613-622.

Programming Semantic Web Applications: A Synthesis of Knowledge Representation and SemiStructured Data. PhD thesis, Lassila, Helsinki University of Technology, Nov. 2007, pp. 1-147.

Rdf model theory, W3c working draft,W3CWorld Wide Web Consortium, Hayes, Feb. 2002, pp. 1-36. Accessed: http://www.w3.org/TR/2002/WD-rdf-mt-20020214/.

Rough sets and approximation schemmes, Marek, et al. Accessed: Aug. 18, 2010, http://www.cs.uky.edu/~marek/papers.dir/06.dir/rs07v4.pdf, pp. 1-7.

Semantic gadgets: Ubiquitous computing meets the semantic web, Lassila et al., In D. Fensel, J. A. Hendler, H. Lieberman, and W. Wahlster, editors, Spinning the Semantic Web: Bringing the World Wide Web to its Full Potential, pp 363-376. MIT Press, 2003. 0-26206-232-1.

The open provenance model, Moreau et al. Accessed: Aug. 19, 2010, http://citeseerx.ist.psu.edu/viewdoc/download?doi=10.1.1.113.7670&rep=rep1&type=pdf, pp. 1-26.

The processes of split and merge in smart spcaes, Boldyrev et al., The 12th Symposium "Problems of Redundancy in Information and Control Systems", 2009, pp. 221-230.

The semantic web, Scientific American, May 2001. Accessed: http://www-sop.inria.fr/acacia/cours/essi2006/Scientific%20American_%20Feature%20Article_%20The%20Semantic%20Web_%20May%202001.pdf, pp. 1-4.

Towards scalable information spaces, Krummenacher et al. Accessed: Aug. 18, 2010, http://sunsite.informatik.rwth-aachen.de/Publications/CEUR-WS/Vol-291/paper03.pdf, pp. 1-10.

Tracking RDF Graph Provenance using RDF Molecules, Ding et al., pp. 1-2. Accessed on Aug. 17, 2010, 2010, http://aisl.umbc.edu/resources/219.pdf.

Tuplespace-based computing for the semantic web: a survey of the state-of-the-art, Nixon et al., The Knowledge Engineering Review, 23(2):181-212, 2007. Accessed: http://www.sti-innsbruck.at/fileadmin/documents/articles/download.pdf.

* cited by examiner

METHOD AND SYSTEM FOR PROJECTING AND INJECTING INFORMATION SPACES

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This is achieved through numerous, individual and personal information spaces in which persons, groups of persons, etc. can place, share, interact and manipulate webs of information with their own locally agreed semantics without necessarily conforming to an unobtainable, global whole. These information spaces, often referred to as smart spaces, are extensions of the 'Giant Global Graph' in which one can apply semantics and reasoning at a local level.

Each information space entity can be considered as an aggregated information set from different sources. This multi-sourcing offers considerable flexibility by enabling the same piece of information to come from different sources. Furthermore, in an information space, information requested by a user may be distributed over several information sets, and therefore in order to deduce an accurate answer to a request, there is the need for extracting (e.g., projecting) or combining (e.g., injecting) the information from different sources into a new information space. However, as the number of queries and resulting information spaces increases, the challenge of keeping track of the combined and/or extracted information among the various information spaces also increases.

SOME EXEMPLARY EMBODIMENTS

Therefore there is a need for an approach for manipulating information spaces at the level of the spaces themselves while preserving the history of operations over the information spaces and the semantic agreements or rules contained within the information spaces.

According to one embodiment, a method comprises receiving a query to project a first information space from a second information space. The method also comprises extracting a subset of information content from the second information space by using a partitioning function. The method further comprises creating the first information space using the extracted subset of information content.

According to another embodiment, an apparatus comprising at least one processor, and at least one memory including computer program code, that at least one memory and the computer program code configured to, with the at least one processor, cause the apparatus to receive a query to project a first information space from a second existing information space. The apparatus is also caused to extract a subset of information content from the second information space by using a partitioning function. The apparatus is further caused to create the first information space using the extracted subset of information content.

According to another embodiment, a computer-readable storage medium carrying one or more sequences of one or more instructions which, when executed by one or more processors, cause an apparatus to receive a query to project a first information space from a second existing information space. The apparatus is also caused to extract a subset of information content from the second information space by using a partitioning function. The apparatus is further caused to create the first information space using the extracted subset of information content.

According to another embodiment, an apparatus comprises means for receiving a query to project a first information space from a second existing information space. The apparatus also comprises means for extracting a subset of information content from the second information space by using a partitioning function. The apparatus further comprises means for creating the first information space using the extracted subset of information content.

According to another embodiment, a method comprises receiving a query to inject a first information space into a second information space. The method also comprises determining whether the first information space and the second information space exist. The method further comprises determining whether the first information space is on a list of information spaces projected from the second information space, if the first and the second information spaces exist. The method further comprises applying a filtering function on information content of the first information space and any other information spaces projected from the first information space, if the first information space is on the list of information spaces projected from the second information space. The method further comprises adding the filtered information content to the information content of the second information space.

According to another embodiment, an apparatus comprising at least one processor, and at least one memory including computer program code, that at least one memory and the computer program code configured to, with the at least one processor, cause the apparatus to receive a query to inject a first information space into a second information space. The apparatus is also caused to determine whether the first information space and the second information space exist. The apparatus is further caused to determine whether the first information space is on a list of information spaces projected from the second information space, if the first and the second information spaces exist. The apparatus is further caused to apply a filtering function on information content of the first information space and any other information spaces projected from the first information space, if the first information space is on the list of information spaces projected from the second information space. The apparatus is further caused to add the filtered information content to the information content of the second information space.

According to another embodiment, a computer-readable storage medium carrying one or more sequences of one or more instructions which, when executed by one or more processors, cause an apparatus to receive a query to inject a first information space into a second information space. The apparatus is also caused to determine whether the first information space and the second information space exist. The apparatus is further caused to determine whether the first information space is on a list of information spaces projected from the second information space, if the first and the second information spaces exist. The apparatus is further caused to apply a filtering function on information content of the first information space and any other information spaces projected from the first information space, if the first information space is on the list of information spaces projected from the second information space. The apparatus is further caused to add the filtered information content to the information content of the second information space.

According to yet another embodiment, an apparatus comprises means for receiving a query to inject a first information space into a second information space. The apparatus also comprises means for determining whether the first information space and the second information space exist. The apparatus further comprises means for determining whether the first information space is on a list of information spaces projected from the second information space, if the first and the second information spaces exist. The apparatus further comprises means for applying a filtering function on information content of the first information space and any other information spaces projected from the first information space, if the first information space is on the list of information spaces projected from the second information space. The apparatus further comprises means for adding the filtered information content to the information content of the second information space.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

Figure 1:
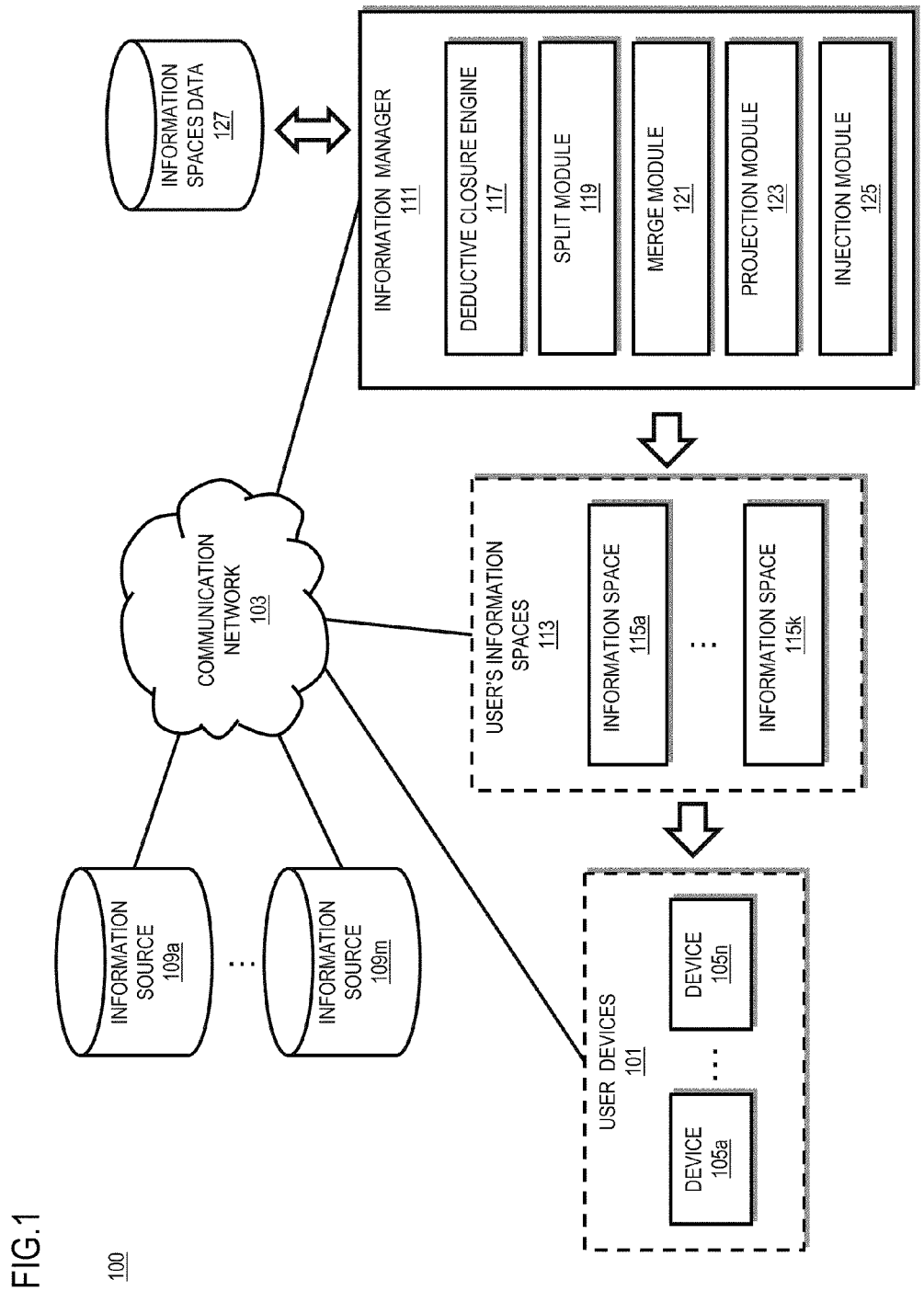
FIG. 1 is a diagram of an information system capable of manipulating information spaces by split, merge, projection, and injection operations, according to one embodiment.

A method, apparatus, and software are provided for projecting and injecting information spaces. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term information space refers to individual and personal information collections in which persons, groups of persons, etc. can place, share, interact and manipulate webs of information with their own locally agreed semantics without necessarily conforming to an unobtainable, global whole. Although various embodiments are described with respect to information spaces, it is contemplated that the approach described herein may be used with other types of information bases or combination of various information bases.

As computing environments become more and more personalized as well as localized, the need for more sophisticated sharing mechanisms between information spaces increases. These sharing mechanisms while at the outset appear to be simple union and partitioning of the information spaces proved more difficult because of the internal interactions of the information and the semantic structures governing that information.

Computing environments based upon information spaces are proving popular in Semantic Web, context gathering and personal information management situations because of their suitability to delineate or bound information on a per-scenario basis. Information spaces thus provide natural mechanisms for distribution, privacy, trust, and information ownership. In addition, based upon general tuple-space principles, they already have the necessary theoretical and practical underpinnings for computing in a similar way to what has already been seen in agent based environments such as M3 and Tripcom and are now becoming integrated with notions such as cloud computing.

Due to several reasons such as security issues, changing agreements and so on, an information space may be split into two or more smaller information spaces. The process of splitting one information space may be volatile, meaning that merging the split information spaces together again may not produce the initial information space, since some links between information could be lost. Conventionally, there is no strict order to justify "split-merge" or "merge-split" procedures. The process involves high volatility in terms of which split information spaces can be merged and which solid information spaces (merged earlier) can be split without damaging the initial contents.

Furthermore, in many occasions keeping track of the process of extracting part of an existing information space while keeping track of the extraction (e.g., projection) may be used in place of a simple split or extraction where no information related to the extraction is maintained. In other words, the process of projection maintains a memory (e.g., a log of what information is extracted and where the information has been sent) whereas a split operation does not maintain such memory. Also many applications of information may involve returning the information content of an extracted part of the information space back to the original information space (injection). To enable the return of information, the issue of keeping the information up to date with the propagation of information among information spaces is important.

FIG. 1 is a diagram of an information system capable of manipulating information spaces by split, merge, projection, and injection operations, according to one embodiment. As shown in FIG. 1 system 100 comprises a set 101 of user devices having connectivity to information manager 111 and users' information spaces 113 through a communication network 103. The communication network 103 may include one or more information sources 109a-109m that could be physically apart in distant locations from each other but accessible by user devices 101 through the communication network 103. Each user has one or more sets of information extracted from information resources 109a-109m by information manager 111 based on users requirements (e.g., queries). Information manager 111 stores user's requested information in user specific information spaces 113 and manages and maintains those spaces.

According to one embodiment, an information space S is defined as a 3-tuple containing a unique name n, a graph I of information, often referred to as information content of the information space, nominally conforming to, for example, Resource Description Framework (RDF) semantics, and a set ρ of rewrite rules over that information:

$$S \rightarrow (n, I, \rho)$$

As shorthand representation, $S_n$ is used to refer to information space name as similarly $I_n$ and $\rho_n$ refer to the information content and rules for information space n respectively. It is assumed that each information space has a unique name and there exists a set of known information spaces.

In one embodiment, information spaces can be represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. For example, RDF is a family of World Wide Web Consortium (W3C) specifications originally designed as a metadata data model. It has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF URI reference (U) or a Blank Node (B), a predicate is an RDF URI reference (U), and an object is an RDF URI reference (U), a literal (L) or a Blank Node (B). A set of such triples is called an RDF graph.

TABLE 1

| Subject | Predicate | Object |
|---|---|---|
| uri://....../rule#CD-introduction, | rdf:type, | uri://............/Rule |
| uri://....../rule#CD-introduction, | uri://....../rule#assumption, | "c" |

The operations to insert, remove and query information from an information space are assumed to exist. The basic form of these operations are defined as follows:

$$\text{insert}(n, g) \rightarrow (n, I \cup g, \rho) \quad (1)$$

$$\text{remove}(n, g) \rightarrow (n, I-g, \rho) \quad (2)$$

where g is a graph of information.

The deductive closure for $S_n$ is denoted as $\Delta_n$ where $\Delta$ is the deductive closure mechanism. In set theory, a set of objects, O, is said to exhibit closure or to be closed under a given operation, R, provided that for every object, x, if x is a member of O and x is R-related to any object, y, then y is a member of O.

Querying an information space is made via a query q and the result returned is a subgraph of the space information graph I under a deductive closure that conforms to q. All queries on an information space are actually over the deductive closure $\Delta$ and not the base information content I. A query q on information space n returns a subgraph that conforms to q.

$$\text{query}(n, q) \rightarrow \Delta_n | = q$$

The given operations can be composed together to form more complex operations such as "update". The update of information in an information space can be expressed as the combination of remove and insert. However, if the intersection of inserted subgraph and removed subgraph is not empty, the order in which insert and remove are applied will affect the operation result. For example, given a graph containing a single element {a}, the operation to insert a graph {b} and then immediately remove the graph {b} as an atomic operation results in the graph {a} where if the ordering of insertion and removal is reversed, the graph {a b} is obtained. Therefore, update operation as defined below, returns a valid result only if the intersection of inserted and deleted subgraphs is empty:

$$\text{update}(n, g_i, g_r) \rightarrow \begin{cases} \text{remove}(n, g_r); \text{insert}(n, g_i) : g_i \cap g_r = \varphi \\ \bot : g_i \cap g_r \neq \varphi \end{cases}$$

As seen in FIG. 1, user devices 101 can include one or more devices 105a-105n. Each user have one or more information spaces 115a-115k that store information deduced from information sources 109a-109m by information manager 111 through local or global reasoning by deductive closure engine 117.

In one embodiment, split module 119 manages and conducts the process of breaking and reconfiguring user's current information spaces into smaller information spaces. This process can be performed in various manners, such as removing all information and creating multiple individual smaller or even empty information spaces or making complete copies of current information spaces. Merge module 121 manages and conducts the process of binding individual information spaces together to create a larger information space. These individual bodies of information may be overlapping in terms of their content. User devices can interact simultaneously with many discrete information spaces. In this case the total information available for a given information space is the union of the deductive closure over all the individual bodies of information. Projection module 123 manages and conducts the process of projecting and partitioning information spaces similar to split with the difference that it keeps track of projected information spaces. Injection module 125 manages and conducts the process of returning the contents of a projected information space back to its original information space.

In one embodiment, metadata (data about other data) such as data describing information spaces, users' queries, etc. are stored in database 127. The information manager 111 uses this data for handling information spaces.

Figure 2:
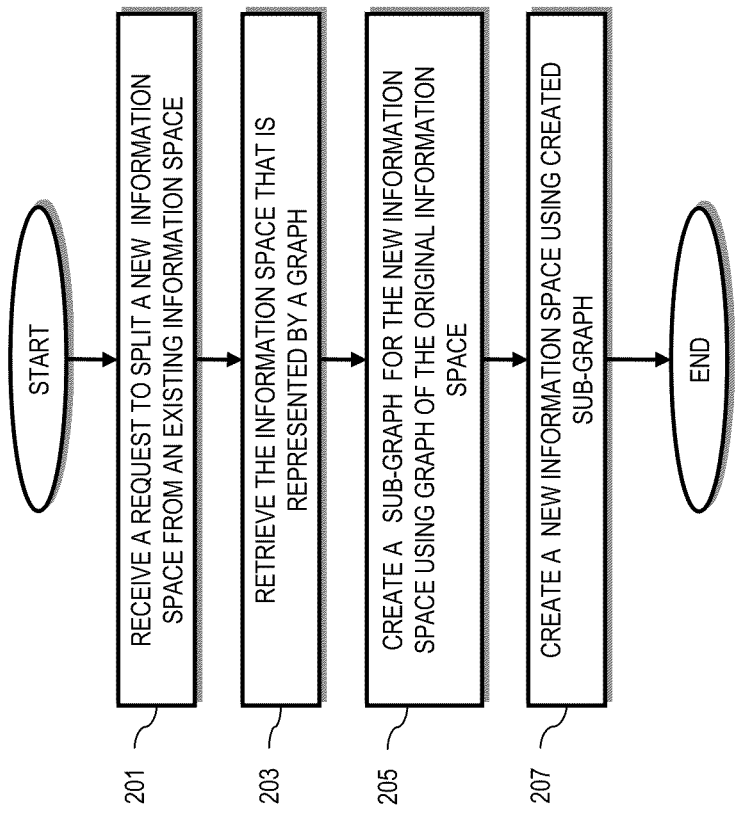
FIG. 2 is a flowchart of a process for applying a split operation on an information space, according to one embodiment.

FIG. 2 is a flowchart of a process for applying a split operation on an information space, according to one embodiment. An information space n can be split or partitioned into two information spaces according to some partitioning criteria over the deductive closure $\Delta_n$ and rules $\rho_n$. For a partitioned information space a, the partitioning function $\phi$ is defined such that the set of rules and information content of a is enough to ensure that the partitioned deductive closure is met; an optimization of this is to find the minimal set of information and rules to preserve the deductive closure. Thus split is defined as follows where n is an existing information space and a is a new information space.

$$\text{split}(n, a, \phi) \longrightarrow \begin{Bmatrix} (a, \phi_a(I_n), \phi_a(\rho_n)) \\ (n, I_n, \rho_n) \end{Bmatrix}$$

where $$\Delta_a = \Delta(\phi_a(I_n), \phi_a(\rho_n))$$

The split module 119 receives, as in step 201 of FIG. 2, a request to extract a new information space from an existing information space, wherein the new information space is represented by a subgraph. In step 203, the split module 119 retrieves the existing information space that is represented by a graph. For the purposes of explanation, the split operation is explained with respect to partitioning of the information into two information spaces where one information space is extracted from an original information space while the original information space remains intact. However, the process can be easily extended to represent splitting of an information space into a plurality of information spaces. As per step 205, a new subgraph for the new information space is created from the original graph and in step 207 a new information space is created using the new graph.

It is noted that the steps of these processes may be performed in any order, as well as combined or separated in a different manner.

Figure 3:
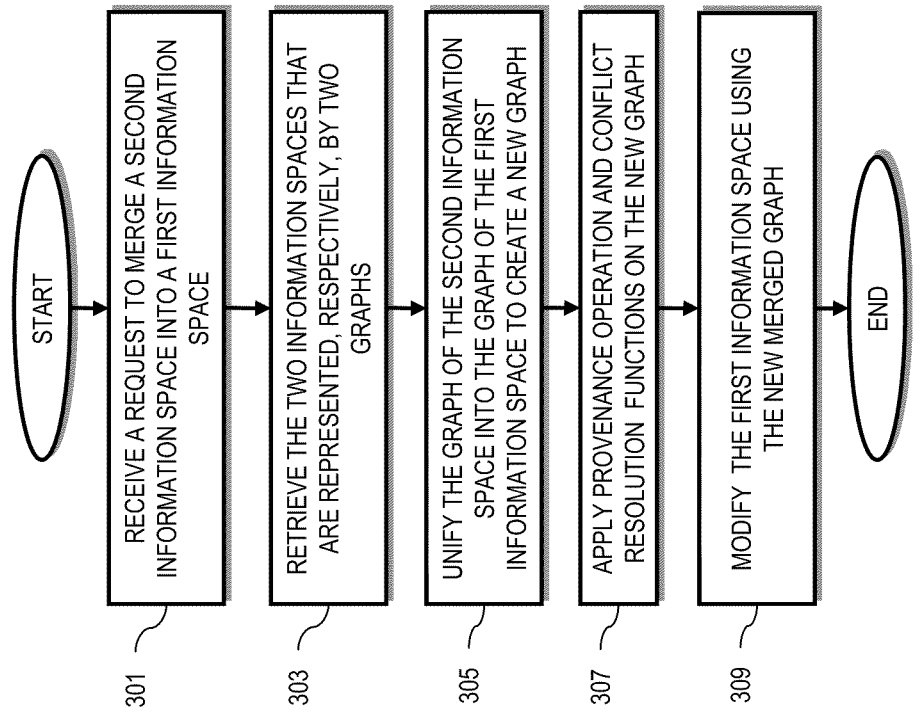
FIG. 3 is a flowchart of a process for applying a merge operation on an information space, according to one embodiment.

FIG. 3 is a flowchart of a process for applying a merge operation on an information space, according to one embodiment. According to one embodiment, the process of merge operation related to merge module 121 of FIG. 1 is described in FIG. 3. Given two existing information spaces a and n, the merge operation in a purely monotonic environment returns the information spaces a merged with n and the unchanged n such that the information sets contained within information spaces a and n (graphs and the rule sets) join together in a:

$$\text{merge}(a, n) \longrightarrow \begin{Bmatrix} (a, I_a \cup I_n, \rho_a \cup \rho_n) \\ (n, I_n, \rho_n) \end{Bmatrix}$$

Monotonicity of logical implication is a property of many logic systems and it states that the hypotheses of any derived fact may be freely extended with additional assumptions. Any true statement in a logic with this property continues to be true, even after adding new axioms. Logics with this property may be called monotonic. The monotonicity of logical rule sets $\rho_a$ and $\Sigma_n$ enable the simple unification of the two rule sets to provide a proper rule set for the new merged information space. It means that adding a formula to a theory never produces a reduction of its set of consequences. Intuitively, monotonicity indicates that learning a new piece of knowledge cannot reduce the set of what is known.

The operation of merge does not necessarily remove the information space n after it is merged into a, however this feature could be created as an addition to the operation:

$$\text{merge}D(a,n) \longrightarrow \{(a, I_a \cup I_n, \rho_a \cup \rho_n)\}$$

However for merge operation an issue may arise when two particular nodes in the information graphs have differing URIs while represent the same element of information and therefore a mechanism for unifying two graphs at the information level is required. The graph provenance problem with respect to information graphs is an open problem and various solutions for it have been suggested. For example, L. Ding, et al. in "*Tracking rdf graph provenance using rdf molecules*" in the Proceedings of the Fourth International Semantic Web Conference, 2005; L. Moreau, et al. in "*The open provenance model*", Technical report, University of Southampton, 2007; and L. Moreau et al. editors, "*Provenance and Annotation of Data*", International Provenance and Annotation Workshop (IPAW), 2006, LNCS 4145, Springer Verlag, May 2006 (which are incorporated herein by reference in their entireties); provide the basis for such mechanisms, where a generic operation $\gamma$ is defined that represents all the mechanisms bound. A monotonic logic cannot handle various reasoning tasks such as reasoning by default (where consequences may be derived only because of lack of evidence of the contrary), abductive reasoning (where consequences are only deduced as most likely explanations) and some important approaches to reasoning about knowledge (the ignorance of a consequence must be removed when the consequence becomes known) and similarly belief revision (new knowledge may contradict old beliefs). Therefore, the logical rule sets of special information spaces are not limited to monotonic logics and non-monotonic systems may be used. This could lead to another issue when the logic of the rule sets $\rho_a$ and $\rho_n$ are non-monotonic, meaning that their consequences are not monotonic; and therefore the pairs of rules could conflict after unification. Various mechanisms for rule conflict resolution are known, for example in the book by P. H. Winston, titled "*Artificial Intelligence*", Addison Wesley Longman Publishing Co. Inc., 2004 (which is incorporated herein by reference in its entirety). Here, a generic function $\delta$ is defined that represents the conflict resolution mechanisms.

Considering the two functions $\gamma$ and $\delta$ for resolving provenance and monotonicity issues respectively, a new definition for merge operation is presented:

$$\text{merge}(a, n) \longrightarrow \begin{Bmatrix} (a, \Upsilon(I_a \cup I_n), \delta(\rho_a, \rho_n)) \\ (n, I_n, \rho_n) \end{Bmatrix}$$

Under this and the other operations, given two information spaces a and b, the following holds:

$$(I_a \cup I_b) \subseteq \gamma(I_a \cup I_b)$$

However, because of the non-monotonicity of the rule sets, this is not necessarily true under the deductive closure. Therefore, the following formula is not always true:

$$\Delta(I_a \cup I_b) \subseteq \Delta(\gamma(I_a \cup I_b))$$

The flowchart of FIG. 3 shows the merge process by merge module 121 form FIG. 1. As seen in FIG. 3, in step 301 a request is received for merging a first existing information space into a second existing information space. In step 303 the two information spaces that need to be merged are retrieved by merge module 121. For the purposes of explanation, the merge operation is explained with respect to joining a second information spaces into a first information space while the second information space is preserved; however, the process can be easily extended to represent joining multiple information spaces into one information space. In step 305 the merge module 121 unifies graphs of the two information spaces into the first graph, and creates a new graph for the merged information space. In step 307 the merge module 121 applies a provenance operation (γ) and a conflict resolution function (δ) to the new graph for the identical nodes to be removed and a new rule set is created. And in step 309 the merge module 121 modifies the first information space using the new graph and the new rule set.

It is noted that the steps of these processes may be performed in any order, as well as combined or separated in a different manner.

Figure 4A:
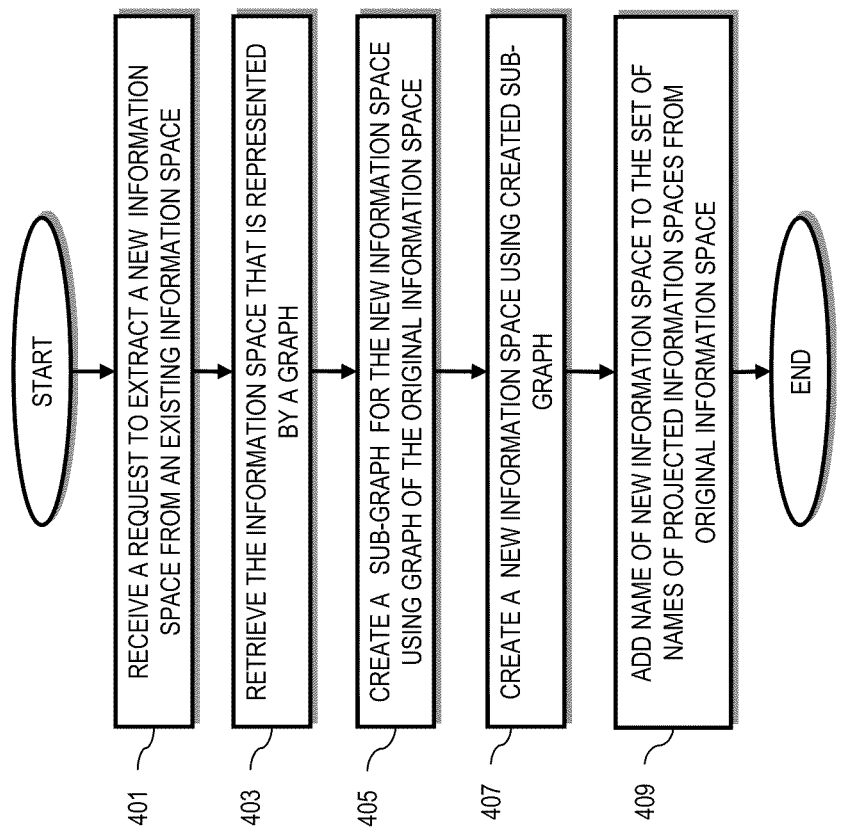
FIGS. 4A and 4B are a flowchart and diagram, respectively, of a process for applying a projection operation on an information space, according to one embodiment.
Figure 4B:
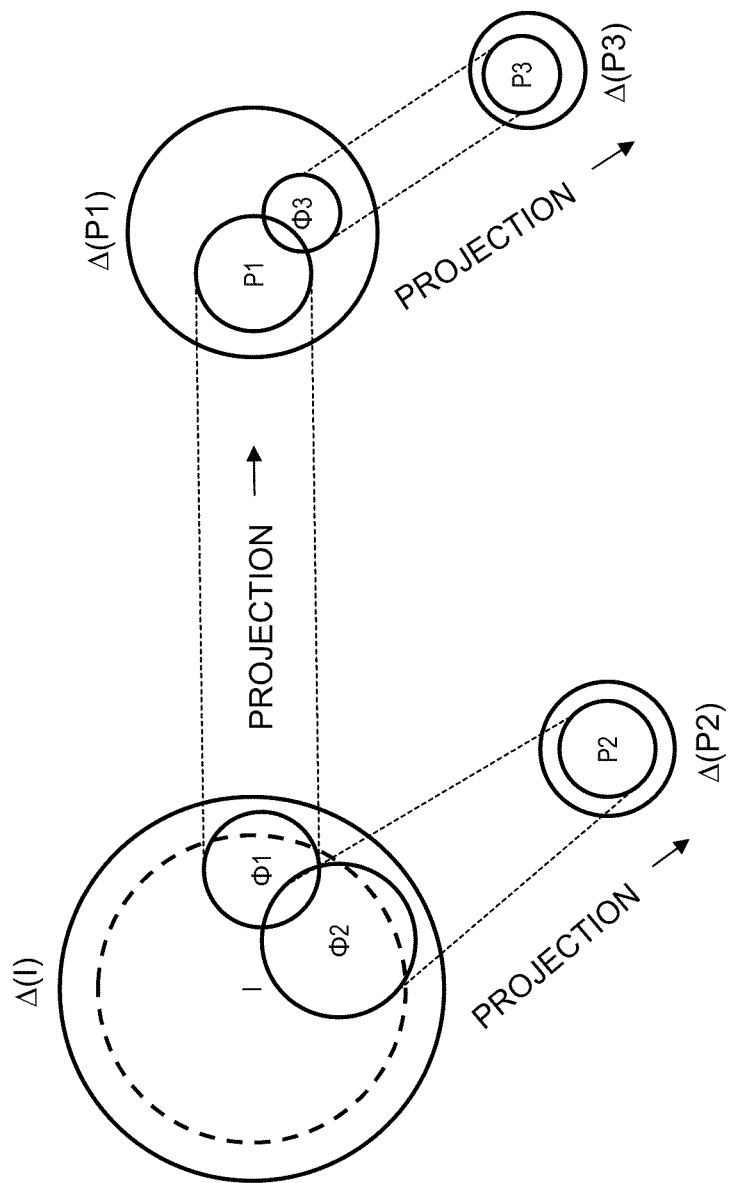

FIGS. 4A and 4B are a flowchart and diagram, respectively, of a process for applying a projection operation on an information space, according to one embodiment. In one embodiment, the projection process related to projection module 123 from FIG. 1 is described. The process of projection is similar to the one of split with the difference that in projection the system keeps track of the projected information spaces using an additional parameter such as P to be added to the definition of information space where P is the list of names of projected information spaces. Therefore, the definition of an information space is modified as follows:

$$S \rightarrow (n, I, \rho, P)$$

In order to conduct projection from information space n, the name of projected information space (e.g., p) and a partitioning function (e.g., analogous to function described with respect to the split operation) are used. Projection is thus defined analogously to split where n is an existing information space and p a new information space:

$$\text{project}(n, p, \phi) \rightarrow \begin{Bmatrix} (p, \phi(I_n), \phi(\rho_n), \emptyset) \\ (n, I, \rho, P \cup \{p\}) \end{Bmatrix} \quad (3)$$

where $$\Delta_p = \Delta(\phi(I_n), \phi(\rho_n)) \quad (4)$$

As seen in formula (3) the newly created information space p has no projection history and therefore its list of names of projected information spaces is an empty set ∅. However, with each projection p created, the newly created information space p is added to the list P of names of projected information spaces of original information space n, shown as P∪{p} in formula (3). Also as seen in formula (4), the deductive closure of the new information space p is created by application of partitioning function φ on the information content I and rule set ρ of the original information space n.

As seen in FIG. 4A, the projection module 123 receives, as in step 401, a request to extract a new information space from an existing information space, wherein the new information space is represented by a subgraph. In step 403, the projection module 123 retrieves the information space that is represented by a graph. For the purposes of explanation, the projection operation is explained with respect to partitioning the information into two information spaces where one information space is extracted from an original information space while the original information space remains intact. However, the process can be easily extended to represent splitting of an information space into a plurality of information spaces. As per step 405, a new subgraph for the new information space is created from the original graph and in step 407 a new information space is created using the new graph. Finally, in step 409, the name of the newly created information space is added to the list of projected information spaces from the existing information space. In one embodiment, the list of projected information spaces is recorded as a parameter (P) of the projection function described below with respect to FIG. 4B.

In another embodiment, the projection module 123 uses the list of projected information spaces to maintain a link between the projected information space and the information space from which it was projected. This link, for instance, enables the return of information (e.g., using the injection operation described with respect to FIG. 6A) from the projected information space to the original information space. In certain embodiments, information may be projected recursively (e.g., a information from a projected information is then projected to yet another projected information, and so on). Accordingly, the return of information may also occur recursively by incorporating changes from each subsequently projected information space. It is contemplated that the return of information from such recursively projected information spaces may occur in the order the information was projected or in any other order. If the return of information is performed in any order, changes to the projected information may be reconciled based on, for instance, the date and time of the change or any other criteria (e.g., person or entity making a change, priority assigned to the change, etc.). Although the link is described herein with respect to the list of projected spaces, it is contemplated that, in addition or alternatively, the link may use any mechanism to relate or link the two information spaces (e.g., a history parameter, another information space to specify the link, or the like).

It is noted that the steps of these processes may be performed in any order, as well as combined or separated in a different manner.

As visualized in FIG. 4B, the nature of projection is such that a tree of projected information spaces can be formed, and thus no circularity is possible. In FIG. 4B, I and P1 are information contents of two information spaces with deductive closures Δ(I) and Δ(P1) respectively; and φ1, φ2, and φ3 are projection functions. According to formula (3), application of functions φ1 and φ2 on information content I result in creation of new information contents P1 and P2 where P1 is φ1(I$_n$) and P2 is φ2(I$_n$). According to formula (4) application of the deductive closure mechanism Δ on the newly created information content and rules sets, would create deductive closures Δ(P1) and Δ(P2) for newly created information spaces. (The rule sets are not shown in the diagram of FIG. 4B). Furthermore, a third projection function φ3 is applied on information space P1—that is created by projection itself—and a new information space P3 with deductive closure Δ(P3) is created which is a second level projection from the original information space n. As seen in FIG. 4B and in formula (3), multiple levels of projection and many projections from a single information space are possible while in each step the basic information space that the projection is applied on is kept unchanged and the list of projected information spaces is preserved in the fourth parameter of an information space (P).

The partitioning function φ is a predefined function which operates based on the preferences of the network management, information providers, information space owners, and/or security and privacy criteria (e.g., predefined criteria) in the architecture of the system.

With adding the fourth parameter to the definition of information space for use in the projection operation, the operations on information spaces that were described before (e.g., with respect to the split operation) is modified by adding the fourth parameter to the information spaces involved. For example, the insert operation of formula (1) will now be:

$$\text{insert}(n,g) \rightarrow (n, I \cup g, \rho, P)$$

The projection operation provides the insert operation with a new feature:

$$\text{insert}(n,g) \rightarrow (n, I \cup g, \rho, \text{insert}(P,g))$$

This means that application of operation insert over a projected information space will propagate over the transitive closure of projected information spaces. In other words, the projection module 123 can propagate, after projection, any modifications to the information content of the original information space related to the projected information space into the information content of the projected information space. Similarly, this feature applies to other operations such as remove and update.

Figure 5:
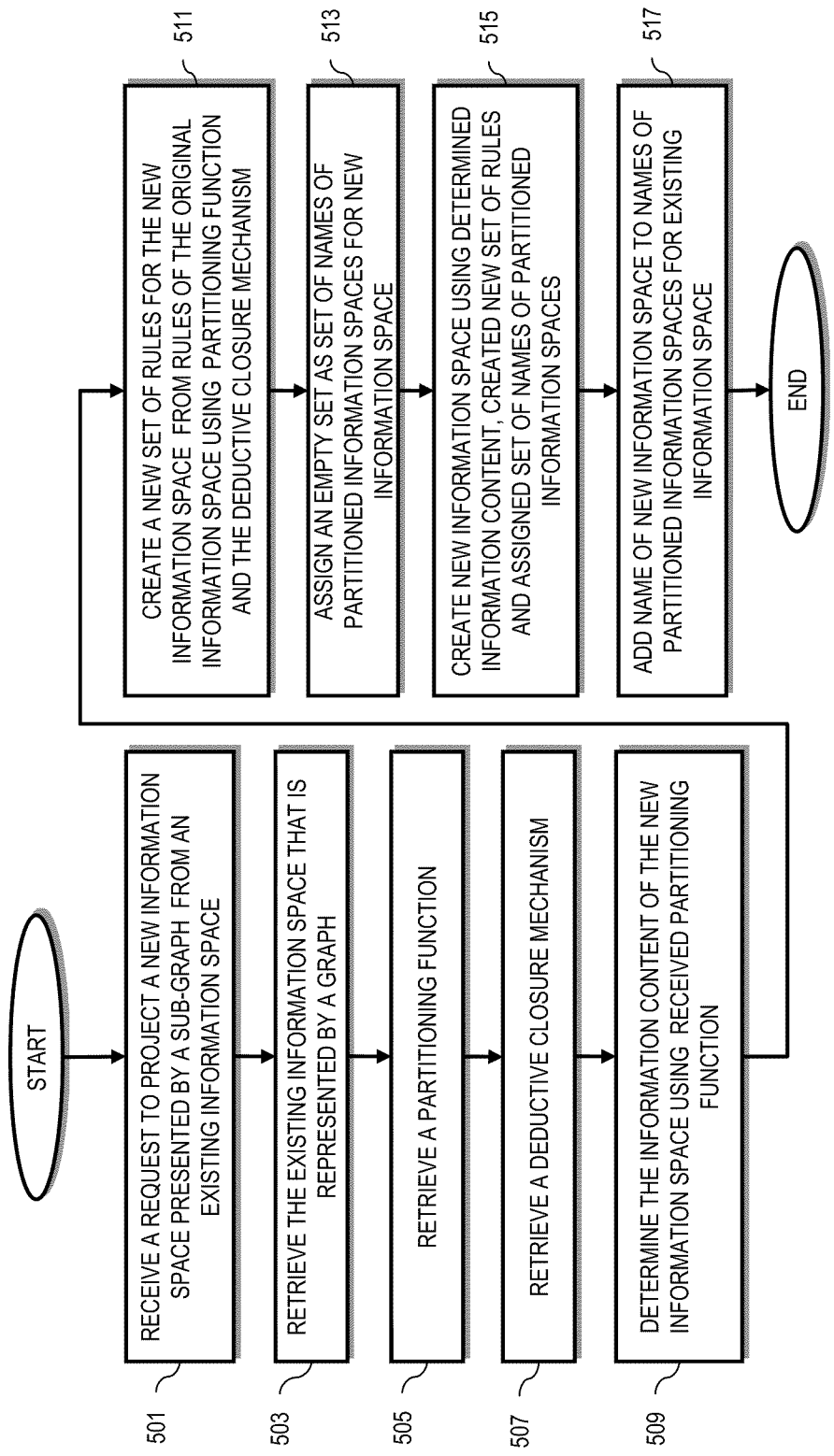
FIG. 5 is a flowchart of a process for applying a projection operation on an information space using an equation, according to one embodiment.

FIG. 5 is a flowchart of a process for applying a projection operation on an information space using an equation, according to one embodiment. In one embodiment, the process of FIG. 5 is implemented in the projection module 123 and is explained with regards to formula (3) above. In step 501, the projection module 123 receives a request for projection from an existing information space n into information space p. In step 503, the projection module 123 retrieves the initial information space n that is to be projected. In step 505, the projection module 123 retrieves a partitioning function φ. By way of example, the partitioning function is previously defined by network managers, information owners, etc. Similarly, in step 507, the deductive closure mechanism Δ, which is also predefined by the network managers, information owners, etc., is retrieved. In step 509, the projection module 123 calculates the information content of new information space p by applying the partitioning function on the information content of the initial information space as $\phi(I_n)$. In step 511, the projection module 123 determines a set of rules for information space p by applying the partitioning function φ and the deductive closure mechanism Δ on the set of rules $\rho_n$ of information space n. Because p is a new information space and does not have any other information spaces projected from it, the list of names of projected information spaces from p is set to an empty set Ø in step 513. Up to this point, all the elements required for creation of new information space p are derived. Therefore, in step 515, the projection module 123 creates the new information space p as a projection of information space n using the derived elements. In step 517, the name or other identifier of the newly created information space p is added to the list of names of information spaces projected from information space n. This is represented by the phrase P∪{p} in formula (3). For example, adding the name of the new information space p to the list of spaces projected from n maintains a link between the two spaces which enables changes to space p to be injected back into space n, if required by the information owner.

It is noted that propagation of updates from the existing information space into the projected new information space is performed such that any addition, deletion or modification of information in the existing space is reflected into the new projected space, if necessary.

Figure 6A:
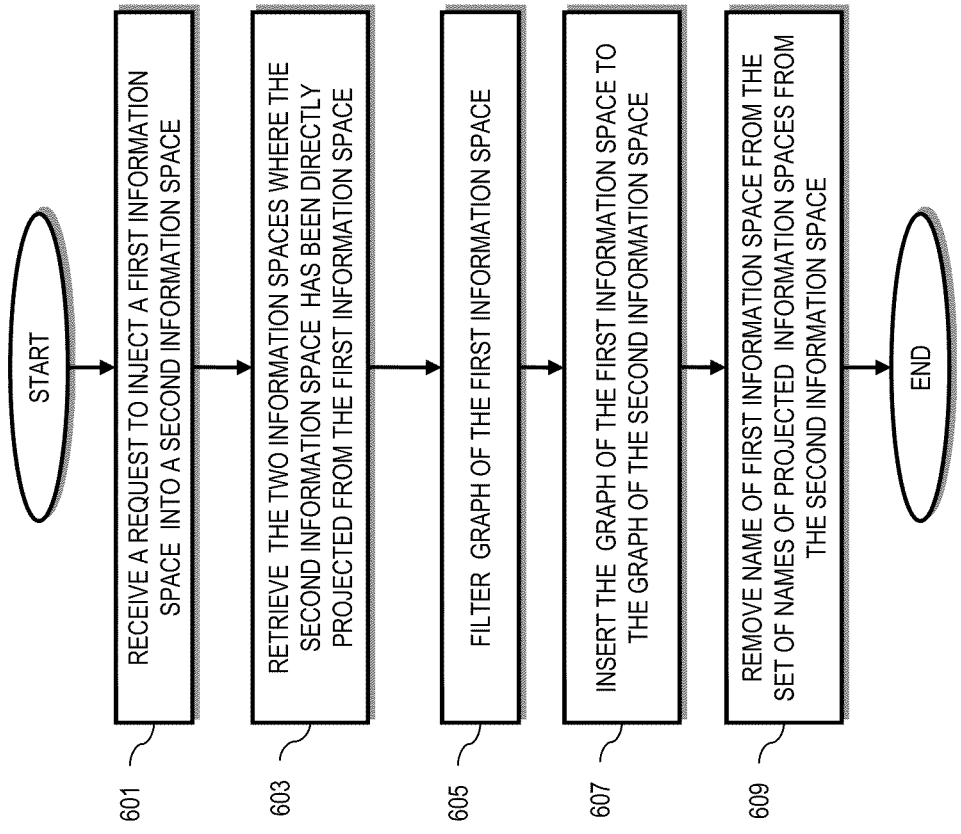
FIGS. 6A and 6B are a flowchart and diagram, respectively, of a process for applying an injection operation on an information space, according to one embodiment.
Figure 6B:
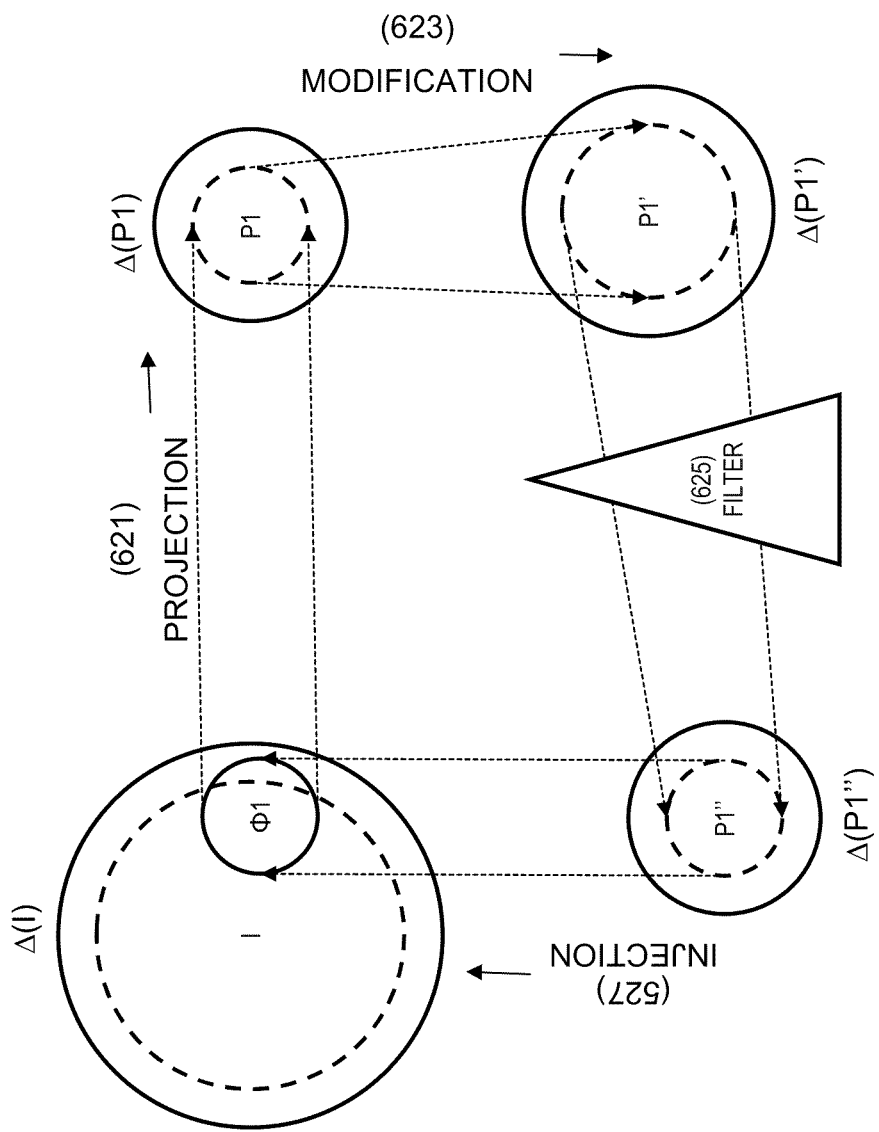

FIGS. 6A and 6B are a flowchart and diagram, respectively, of a process for applying an injection operation on an information space, according to one embodiment. The injection process is related to injection module 125 from FIG. 1. In various situations it might be necessary to return (or inject) the contents of a projected information space i back to the original information space n that it was projected from. However, the projected information space may have been updated since the projection took place and might have different information content. Therefore, a filter φ is needed in order to remove any inserted information that is not required to be injected back into the original information space. The information removed by the filter may include, for instance, personal information that has been added to the projected information space that was not part of the original information. The injection also induces a merge of information over any information spaces that were further projected from the projected information space. It is noted that for an injection operation to apply, both information spaces i and n must exist:

$$\text{inject}(i, n, \phi) \rightarrow \begin{cases} \text{fail}: i \in P_n \\ (n, I_n \cup I_i, \rho_n, P - \{i\}): i \notin P_n \wedge P_i = \emptyset \\ (n, I_n \cup \text{merge}(P_i, i, \phi), \rho_n, P): i \notin P_n \wedge P_i \neq \emptyset \end{cases} \quad (5)$$

As seen in formula (5) above, if information space i does not exist in list P of projected information spaces from information space n, the injection operation will fail. This is because an information space not projected from information space n cannot be injected into n. However, if i already belongs to the list of projections from n, and there are no other information spaces projected from i, the information content of i is combined into the information content of n and name of space i is removed from the list of projections from n. In another case scenario where there are other information spaces projected from i (list of projections from i is not empty), in order to inject information space i into information space n, the projections from i are merged or injected back into i recursively over the closure of projected spaces of i. Merging the information spaces projected from spaces i back into i, using the filtering function φ prevents any undesired updates in projected information spaces that took place after projection, from being injected into space n.

For example, assuming that an information owner is writing an article comprising several chapters on a home computer. The information owner may want to create a duplicate from one or more chapters of the article into a notebook computer in order to be able to continue working while away from home. The projection operation can create a new information space including only the desired chapters while maintaining the link to keep track of the projection. At the end of the day, the information owner may want to inject updates back into the original article except updates on a certain chapter or a section of a chapter. In this case the injection operation using a filtering function can ensure exclusion of the undesired updates and inject the rest of the updates from the notebook into the original article on the home computer.

Moreover, as previously discussed, updated information from projected information spaces may be returned to the spaces i in the order of projection or in any order. Multiple changes or conflicting changes may then be returned and the changes resolved at the spaces i using any rule or criteria. Referring to the example above, for instance, the information owner may have used two separate notebook computers containing two separate projections of the same chapter. The information owner may set a rule defining how updates on one notebook computer will be handled in relation to changes on the other notebook computer. For example, a rule may state that when there are conflicting or overlapping changes, the more recent change controls. Alternatively, a rule may state that changes on one notebook computer always take precedence over changes on another notebook computer.

The flowchart of FIG. 6A shows the injection process by injection module 125 from FIG. 1. As seen in FIG. 6A, in step

601, the injection module 125 receives a request for injecting a first existing information space into a second existing information space. In step 603 the injection module 125 retrieves the two information spaces that one is to be injected into the other. For the purposes of explanation, the injection operation is explained with respect to joining an already projected second information space into a first information space it was projected from. However, the process can be easily extended to represent joining a plurality of already projected information spaces into one information space from which the spaces all were projected. In step 605, the injection module 125 filters the graph of the first information space using a filtering function $\phi$, described above in formula (5), for the undesired modifications made since the projection of the first information space from the second information space to be removed. In step 607, the filtered graph of the first information space is inserted into the graph of the second information space by the injection module 125. Next, in step 609, the injection module 125 removes the first information space from the list of information spaces projected from the second information space. In one embodiment, the removal of the first information space from the list breaks the projection relationship between the two information spaces. As a result, after completion of the injection operation, the first information space cannot be reinjected into the second information space.

In one embodiment, the injection process operates on information spaces i that are immediate projections from n. Also after the injection the information space i and any other information spaces projected from i will no longer be addressable by information space n and will be considered as nonexistent from the point of view of n. Therefore, as previously stated, it is also implied that once an information space is injected into another information space it cannot be injected a second time.

As visualized in FIG. 6B, I and P1 are information contents of two information spaces with deductive closures $\Delta(I)$ and $\Delta(P1)$ respectively; and $\phi 1$ is a projection function. According to formula (3), application of functions $\phi 1$ on information content I results in creation of new information content P1 where P1 is $\phi 2(I_n)$. According to formula (4), application of the deductive closure mechanism $\Delta$ on the newly created information content and rules set, would create deductive closures $\Delta(P1)$ for the newly created information space. (The rule set is not shown in the diagram of FIG. 6B). After projection (step 621) in FIG. 6B is applied, during modification (623), the information content P1 could be modified into P1'. In the process of injecting P1 back into I, some of the modifications on P1 can be removed. Accordingly, in step (3) of FIG. 6B, a filter is applied to P1' and as a result P1' is converted to a new information space P1" to remove some of the modifications. In one embodiment, the filtering function is based on predefined criteria. This criteria (e.g., personal information, incompatible information, etc.) may be defined by the service provider, user, network operator, information owner, and/or the like. Next, in step (627) of FIG. 6B, the injection operation of formula (5) is applied to the new information space P1" to inject P1" into I.

Figure 7:
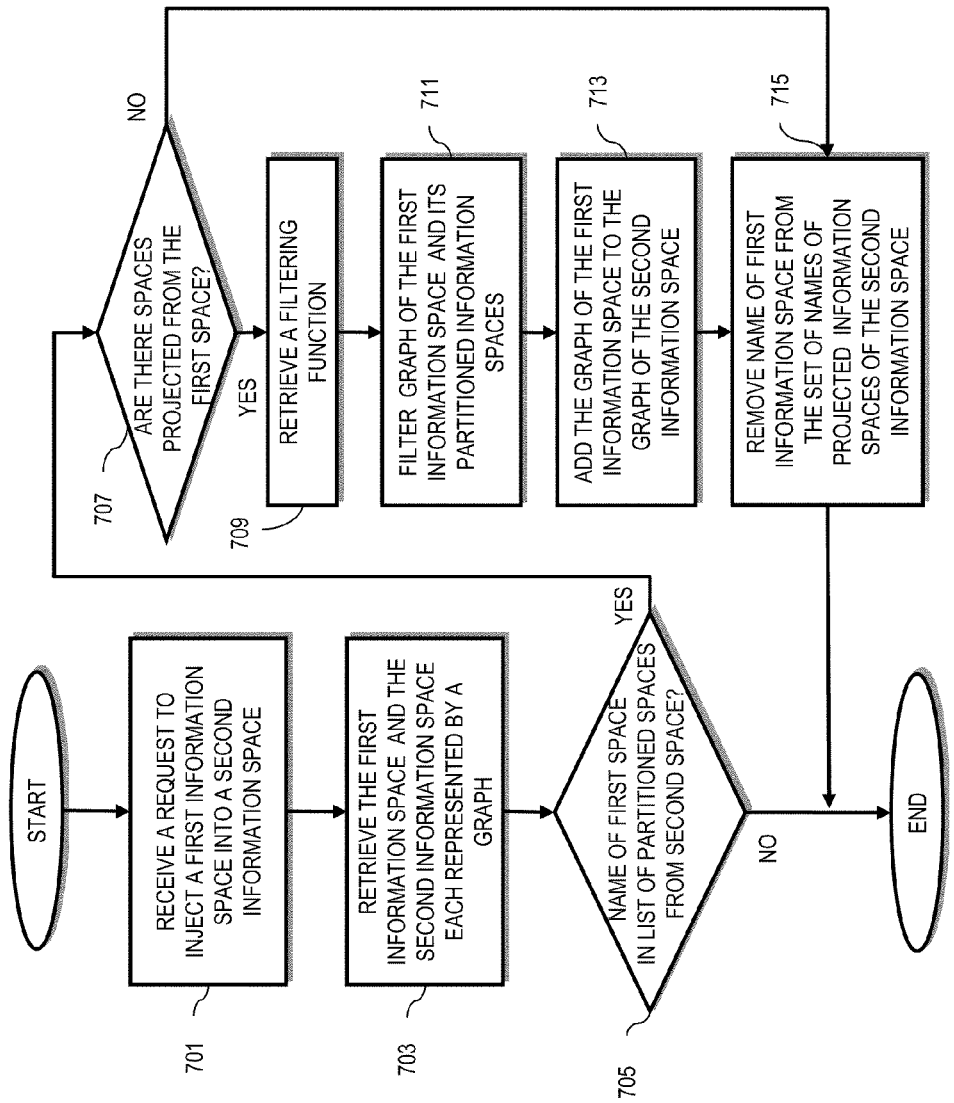
FIG. 7 is a flowchart of a process for applying an injection operation on an information space using an equation, according to one embodiment.

FIG. 7 is a flowchart of a process for applying an injection operation on an information space using an equation, according to one embodiment. The steps of flowchart of FIG. 7 are explained with respect to formula (5) above. In step 701, a request for injection of a first information space (i) into a second information space (n) is received by the injection module 125. In step 701 the injection module 125 retrieves the two existing information spaces i and n. Injection can occur if information space i has been previously projected from information space n. The injection module 125 then, per step 705, checks whether this condition holds. If the condition does not hold (i$\in P_n$ in formula (5)), the operation is not applied, and the process fails. Otherwise, if the condition holds (i$\notin P_n$ in formula (5)), in step 707, the injection module 125 determines whether there are information spaces that have been projected from space i. If such a projected space from space i does not exist, per step 713 the information content of space i is added into the information content of information space n. and in step 715 name of space i is removed from the list of projected spaces from n.

Otherwise, if projected spaces from i exist, these projections can be added back into i so that any desired changes that has been made to the information after i was projected from n can be added to i before i is injected into n. For example in the example given before for an article being written by a user. The users may first project one chapter from the article, then project one section from that chapter, and apply modifications on the section. When the user decides to inject the new changes back into the main article. The injection module 125 checks whether the chapter information has been projected and therefore before the chapter is injected back into the main article the modifications on the section are added to the chapter. In step 709 the injection module 125 retrieves a predefined filtering function. In step 711 the injection module 125 applies the filtering function on information space i and its projections. Application of the filtering function updates i to a version of i that includes any information from information spaces projected there from.

In addition, the filter $\phi$ is applied on information space i for any undesired (e.g., based on predefined criteria) modifications on information space i performed after it was projected from n to be removed. For example, the user may want to ignore any inserted text in the article that has been inserted after a certain time, but add the modifications before that time. The filtering function $\phi$ could be predetermined in the system architecture, defined based on network administration regulations or defined by information owners. Therefore, while the process can be automated, the fact that whether or not updated information is to be injected into the original information space is considered to be part of any surrounding architecture and logic. In step 713, the filtered information content of space i is added into the information content of information space n. Finally, in step 715, the name or other identifier of space i is removed from the list of projected spaces from space n. This is because space i has been injected back into space n and therefore space i will be considered as nonexistent from the perspective of space n. By removing of the names of one information space from the list of information spaces projected from another information space, the link between the two information spaces is removed. In other works space i and any subsequently projected spaces from space i are no longer addressable from space n.

In one embodiment, the notion of information space is extended to cover various aspects of the split/merge and projection/injection operations. As explained before, one of the building blocks of an information space is a graph of information nominally conforming to, for example, Resource Description Framework (RDF) semantics. It is possible to have larger grained structures within RDF graphs based on the ontologies that represent these graphs. An ontology is a formal representation of a set of concepts within a domain and the relationships between those concepts. It is used to reason about the properties of that domain, and may be used to define the domain. In theory, an ontology is a "formal, explicit specification of a shared conceptualization". An ontology provides a shared vocabulary, which can be used to model a domain, that is, the type of objects and/or concepts that exist, and their properties and relations.

RDF graphs can be combined in a unified graph as well as decomposed into their constituent subgraph. However, in order to avoid information loss, the logical relations between graph nodes need to be preserved during the process or the nodes need to be functionally grounded. The presence of Blank Nodes (BNodes) complicates RDF graph decomposition since BNodes do not come with universally unique identifiers. A BNode is a node that is not a URI reference or a literal. In the RDF abstract syntax, a BNode is just a unique node that can be used in one or more RDF statements, but has no intrinsic name. BNodes from different RDF graphs are assumed different by default; however there is no way to recognize whether two BNodes represent the same or different things. Some BNodes could be functionally grounded given a background ontology stating that some properties are instances of web ontology language OWL Inverse Functional Property (IFP) or OWL Functional Property (FP). The definition to build a three-fold categorical partition on RDF nodes can be extended; this is fully described in Ding et al. in "Tracking RDF Graph Provenance using RDF Molecules" (Technical report, 2005, Proceedings of the Fourth International Semantic Web Conference, 2005); which is incorporated herein by reference in its entirety.

Ding et al. defines the concept of molecules of an RDF graph according to some ontology whereas named graphs are defined as a particular region of a graph. Like the molecules in natural science, the molecules of an RDF graph are the finest components into which the graph can be decomposed without loss of information. Molecules are not fixed at creation time; instead, they are the decomposition results of a given RDF graph. If an RDF graph is free of BNodes, each triple constitutes a molecule; otherwise, triples are grouped into molecules according to the background ontology and the decomposition algorithm. The described approaches system 100 considers molecular structures for RDF graphs.

An RDF graph decomposition as defined by Ding et al. consists of three elements (W, d, m), the background ontology W, the decompose operation d(G, W) which breaks an RDF graph G into a set of subgraphs $\hat{G} = \{G_1, G_2, \ldots, G_n\}$ using W, and the merge operation m($\hat{G}$, W) which combines all elements in $\hat{G}$ into the a unified RDF graph G' using W. In addition, a decomposition should be lossless such that for any RDF graph G: G=m(d(G, W), W). When the elements in $\hat{G}$ are disjoint, G is called a partition of G.

Given a graph under deductive closure $\Delta$ and set of ontologies W, a decomposition as a lattice of molecules ordered by graph inclusion can be constructed in the manner of Ding et al. This is denoted as:

$$d_{\subset}(n, W)$$

Neither the top nor the bottom elements representing the empty molecule or the complete graph necessarily exist; although the latter exists if the set of ontologies specified completely covers the graph.

Given a graph and a partitioning function $\phi$, the graph can be divided into two parts: a subgraph S that satisfies $\phi$ and the complement of S denoted as C. However, there will be individual nodes in the graph representing RDF triples that are part of both subgraphs. These nodes that are in the intersection of two subgraphs are said to be boundary nodes.

$$boundaryNodes(n, \phi) \rightarrow \begin{pmatrix} nodes(\phi(\Delta_n)) \\ \bigcup \\ nodes(\Delta_n - \phi(\Delta_n)) \end{pmatrix} \quad (6)$$

Figure 8:
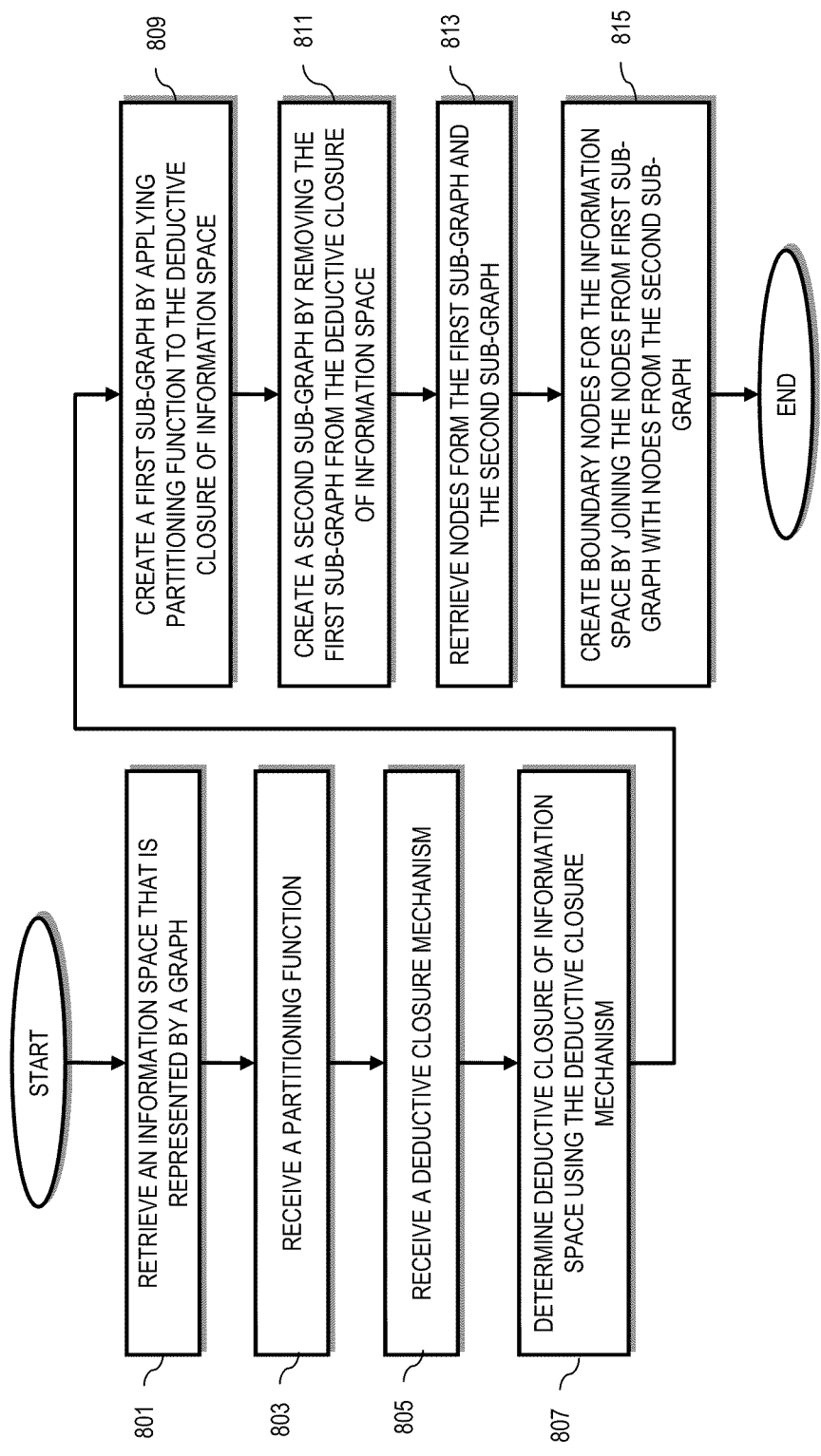
FIG. 8 is a flowchart of a process for defining a boundary for an information space, according to one embodiment.

FIG. 8 is a flowchart of a process for defining a boundary for an information space, according to one embodiment. The process of boundary definition is conducted by information manager 111. In steps 801-805 of FIG. 8 an information space, a partitioning function, and a deductive closure mechanism are received as inputs to the boundary determination function of information manager 111. In step 807, the boundary determination function determines the deductive closure of the information space and in step 809 the partitioning function is applied to the deductive closure and as a result a first graph is created. In step 811, the result graph of step 809 is removed from the deductive closer determined in step 807 and as a result a second graph is created. Next, step 813 retrieves the nodes from the first and the second graphs resulted from steps 809 and 811. The outcome of the execution of step 813 will be the first row and the second row on the right hand side of formula (6) above, respectively. In step 815, the set of boundary nodes for the input information space is generated by joining the two sets of nodes retrieved.

The process of splitting and projecting information spaces generally use more semantically 'complete' structures, i.e., molecules, rather than triples. This minimizes the loss of information at the 'edges' of the graph caused by indiscriminated breaking of arcs between nodes.

For each boundary node, a molecule from $d_{\subset}$ which contains that boundary node can be selected. Generally, this is guided by some heuristics but one can filter the lattice of molecules to favor a particular sub-lattice; for example, the least lower bound of $d_{\subset}(n, w) - \emptyset$ for molecules of a certain size. This boundary can be used in two ways, firstly it can be used to create a history; and secondly, to extend the set generated by the partitioning function $\phi$. For example the definition of split operation can be extended as follows:

$$splitB(n, a, \phi) \rightarrow \begin{Bmatrix} (a, \phi(I_n) \cup B, \phi(\rho_n), \emptyset) \\ (n, I_n, \rho_n, P_n) \end{Bmatrix}$$

where B is the boundary set computed according to some heuristics with respect to the requirements of that split.

In one embodiment the notion of storing histories or 'memories' of activities of an information space and how this can be used to extend the information that is returned as answers to queries is introduced. When an information space is split or projected, the information can be recorded about how newly created information space(s) are related to the original information space. This requires an additional element in the definition of information space which is the set of histories indexed by name. The extended definition of an information space including set of histories H is as follows:

$$S \rightarrow (n, I, \rho, P, H)$$

When an information space is split or projected, the boundary can be calculated using formula (6) and the boundary information can then be stored in the split information space's history:

$$splitBH(n, a, \phi) \longrightarrow \begin{Bmatrix} (a, \phi(I_n) \cup B, \phi(\rho_n), \beta_a) \\ (n, I_n, \rho_n, P_nH_n \cup \beta_n) \end{Bmatrix} \quad (7)$$

where B is the boundary set and $\beta_a$ and $\beta_n$ are similar to B with different heuristics tailored towards the information necessary for preservation of the history.

Figure 9:
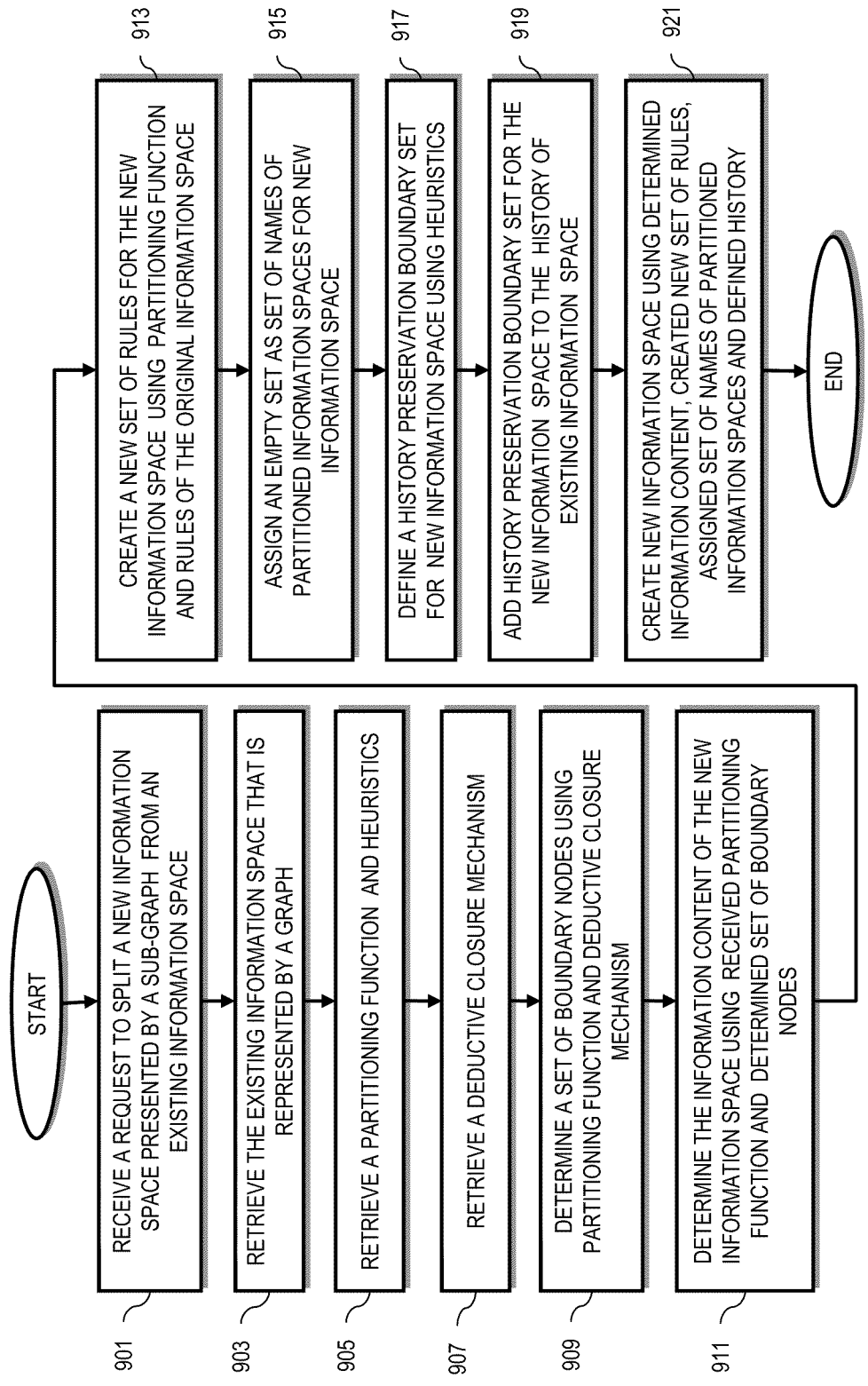
FIG. 9 is a flowchart of a process for applying a split operation on an information space considering boundary and history information, according to one embodiment.

FIG. 9 is a flowchart of a process for applying a split operation on an information space considering boundary and history information, according to one embodiment. The steps of flowchart of FIG. 9 are explained with regards to formula (7) above. In step 901 the split module 119 receives a request for splitting of information space n into information space a. In step 903 the split module 119 retrieves the initial information space n that needs to be split is retrieved. The partitioning function $\phi$ and the heuristics are retrieved by the split module 119 in step 905. In step 907 the split module 119 retrieves the deductive closure mechanism. Step 909 includes the process of boundary determination for information space n as explained in detail in FIG. 8. In step 911 the split module 119 determines the information content of new information space a using the partitioning function and the boundary calculated in previous step as $\phi(I_n) \cup B$. In step 913 the split module 119 calculates a set of rules for information space a by applying the partitioning function $\phi$ on set of rules $\rho_n$ of information space n. Since a is a new information space created by the split operation, the list of names of projected information spaces from a is not relevant to the operation and is set to an empty set Ø in step 915. In step 917 the split module 119 defines a history preservation boundary set $\beta_a$ for information space a and in step 919 the split module 119 adds the boundary set $\beta_n$ to the history of initial information space n in phrase $H_n \cup \beta_n$. Up to this point all the elements required for creation of new information space a are derived. Therefore, in step 921 the split module 119 creates the new information space a as a partition of information space n using the derived elements.

Under the merge operation the history information can be utilized to enhance the core information content I of a information space and thus provide additional information for the unification function γ:

$$mergeH(a, n) \longrightarrow \quad (8)$$
$$\begin{Bmatrix} (a, \Upsilon(I_a \cup I_n \cup H_a[n] \cup H_n[a]), \delta(\rho_a, \rho_n), P_a, H_n - \{H_n[a]\}) \\ (n, I_n, \rho_n, P_n, H_n) \end{Bmatrix}$$

Another variation of this operation could be re-computing the new boundary between a and n for the information space being merged.

Figure 10:
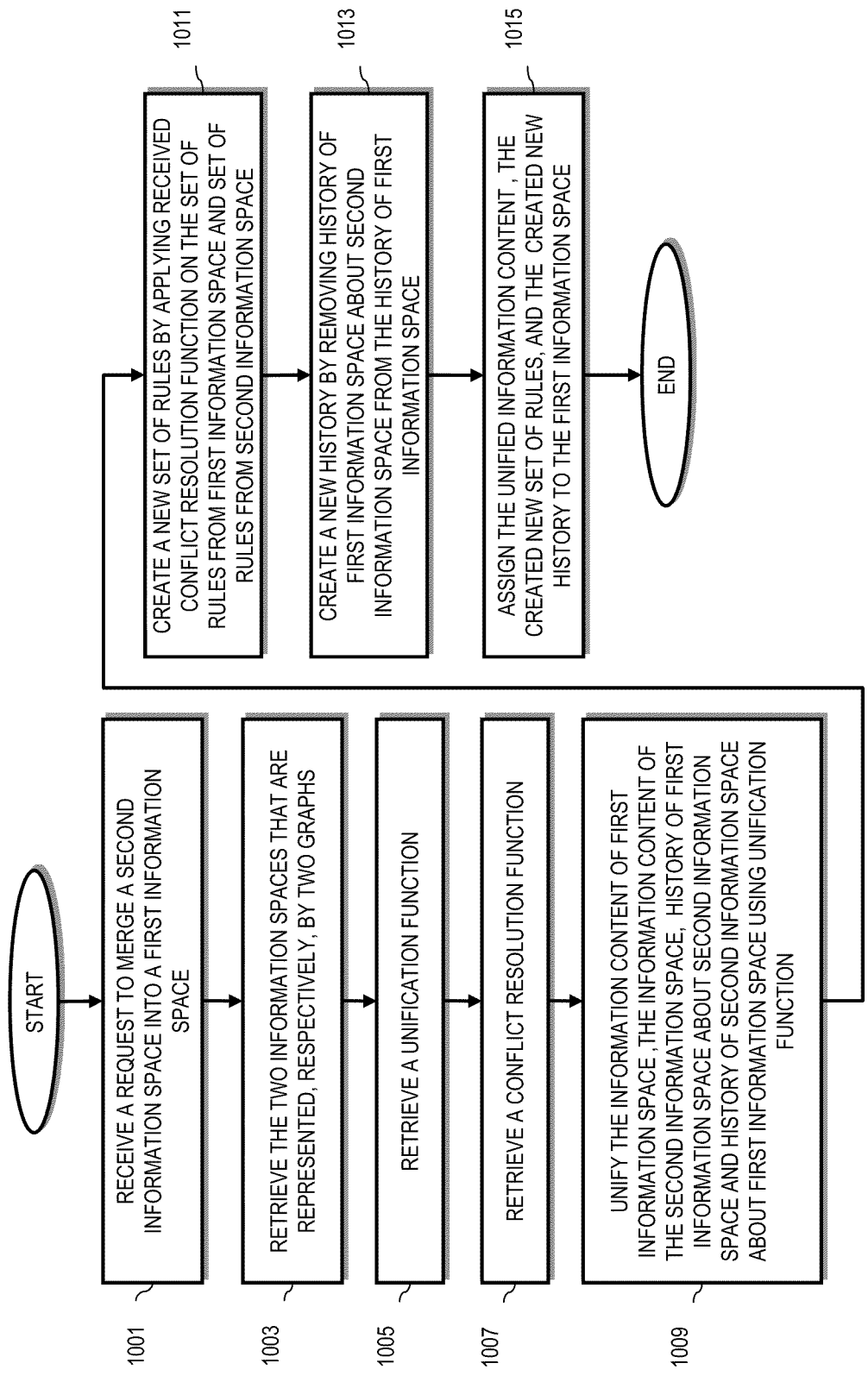
FIG. 10 is a flowchart of a process for applying a merge operation on an information space considering boundary and history information, according to one embodiment.

FIG. 10 is a flowchart of a process for applying a merge operation on an information space considering boundary and history information, according to one embodiment. The steps of flowchart of FIG. 10 are explained with regards to formula (8) above. In step 1001 a request for merging information spaces a and n is received by the merge module 121. In step 1003 the merge module 121 retrieves the two existing information spaces a and n that need to be merged. In step 1005 the merge module 121 retrieves the unification function γ and in step 1007 the merge module 121 retrieves the conflict resolution function δ. In step 1009 the merge module 121 applies the unification function on the information content of the two information spaces and a unified content is created. However, the information content of the merged information space is not complete until the history that each initial information space has about the other is incorporated into the information content. Therefore the history of each information space about the other is unified with the information content in step 1009 of FIG. 10 as shown by phrase $I_a \cup I_n \cup H_a[n] \cup H_n[a]$ in formula (8). In step 1011 the merge module 121 creates a new set of rule by applying the conflict resolution function to the sets of rules of the two initial information spaces. This is applied by phrase $\delta(\rho_a, \rho_n)$ in formula (8). The conflicts may arise from the fact that the two initial information spaces may include rules that could lead to contradicting results for the same query. For example one information space may have a rule that "If A is true then B is true" while the other information space may include a rule stating "If A is true then B is false". After the two information spaces are merged, existence of these rules may lead to conflicts in query results. Application of function S resolves contradiction in the rules. In step 1013 the merge module 121 creates a new history for the merged information space by removing the history of first information space about second information space from the history of first information space as seen in phrase $H_n - \{H_n[a]\}$ in formula (8). Thus, after the merge operation, the initial information space a is replaced by the newly created merged information space, thereby the history about the old a need not be retained any longer. Up to this point all the elements required for creation of new information space a are derived. In step 1015 the merge module 121 assigns the created elements such as information content, rules and history to the first information space (information space a) as the result of merge. It is noted that the list representing names of information spaces partitioned from a ($P_a$) remains unchanged. Furthermore, the information space n will remain unchanged as well.

By making a query over an information space, generally some results are returned. However, since information spaces are finite, some queries may fail due to lack of information. The failure of a query could be interpreted depending on whether the closed or open world assumption is made. In a closed world assumption a query failure could be interpreted as "an answer to the query does not exist" while in an open world it could be interpreted as: "existence of an answer is unknown".

Existence of histories provides means for utilizing the extra information to approximate the query if run over a larger information extent. For any given query, the search space can be expanded over the core information and then the core plus any combination of histories giving a structure similar to the "possible worlds" semantics. The concept of possible worlds is used to express modal claims. The term "modality" covers such notions as "possibility", "necessity", and "contingency". As an example on query results interpretation, if a query returns a larger result when extended over an information content which is the union of the core I and a selection of histories from H, then it could be inferred that the query involves information that may additionally be present in the information spaces that the current information space had 'met' in the past (information space have got separated from each other by splitting). As another example, it would be possible to order the results of a query over various combinations of core information and selections of histories to evaluate which potential information spaces may have additional information and to possibly infer the kinds of possible extended results.

Based on the examples, the full query can be made by merging the core information space with the suggested information spaces or by projection from those information spaces—with the query providing information about how the partitioning function $\phi$ for the projection is generated. It is noted that, since information spaces change over time as they are being used, there is no guarantee that the desired, correct, or even any answer to the query is found. The described arrangement provides suggestions on how a query can be better fulfilled through additional knowledge that has been gained by information space interactions in the past.

Figure 11A:
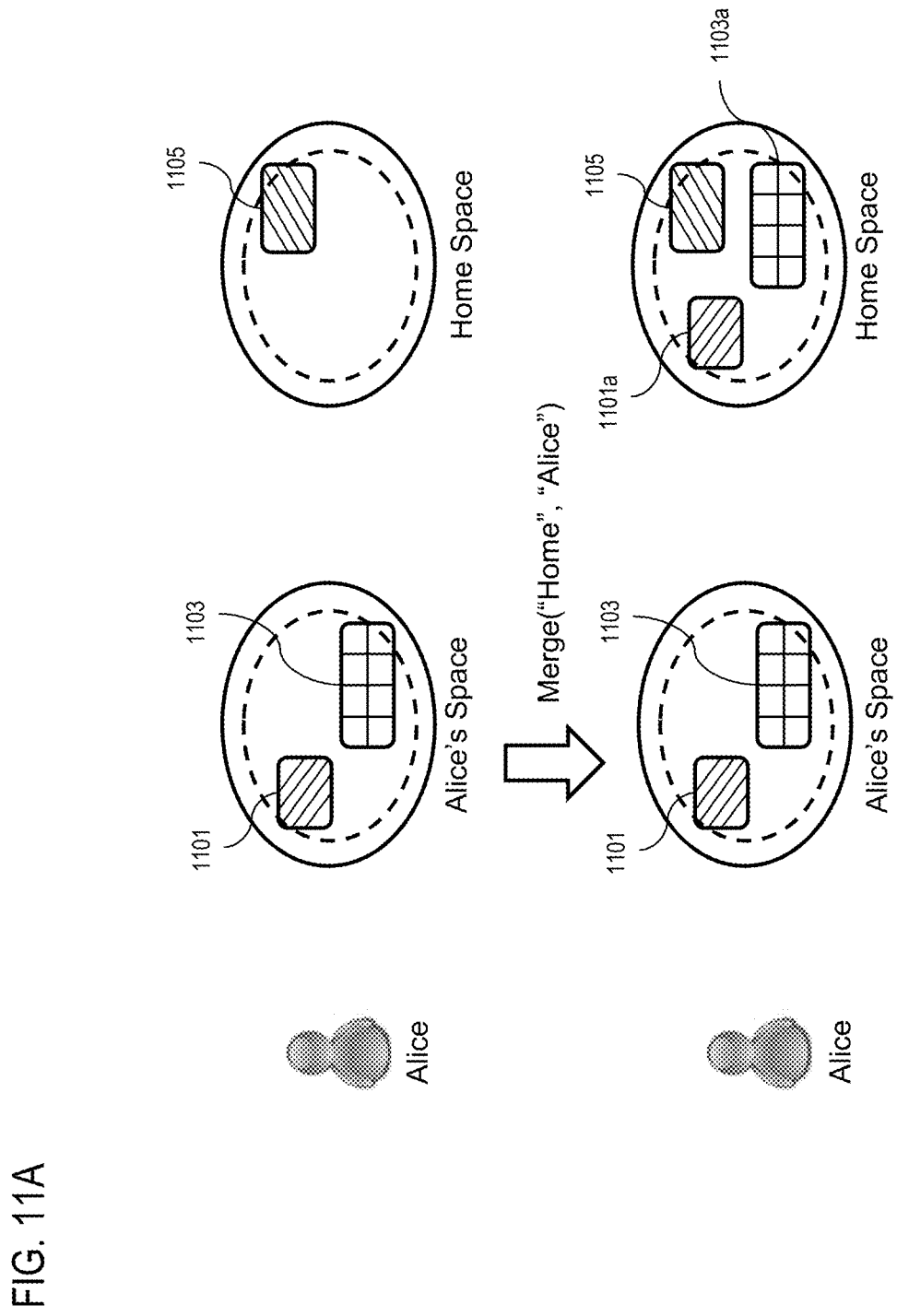
FIGS. 11A-11D are diagrams of example use cases for applying a split, merge, projection, and injection operation, respectively, on an information space, according to various embodiments.
Figure 11B:
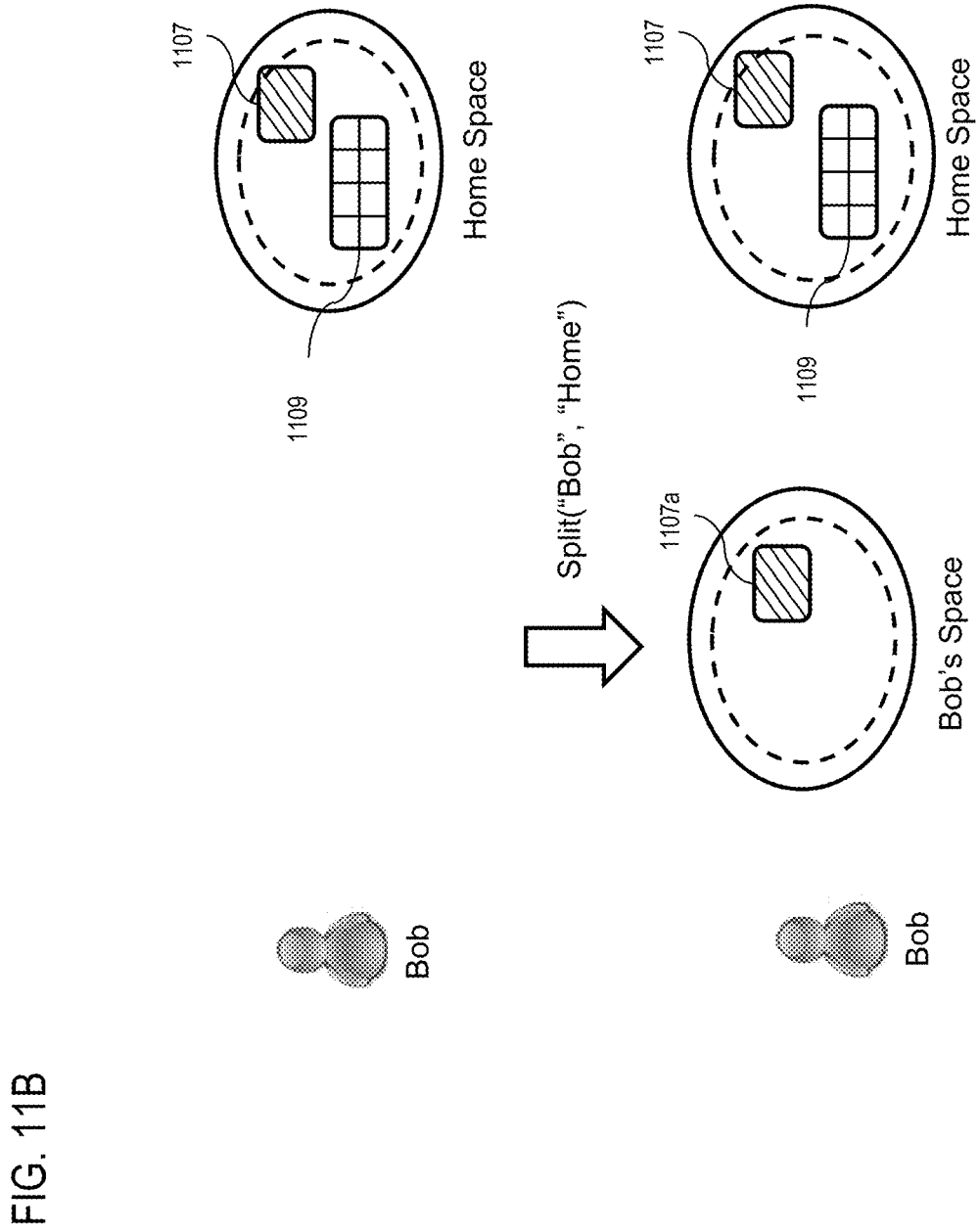
Figure 11C:
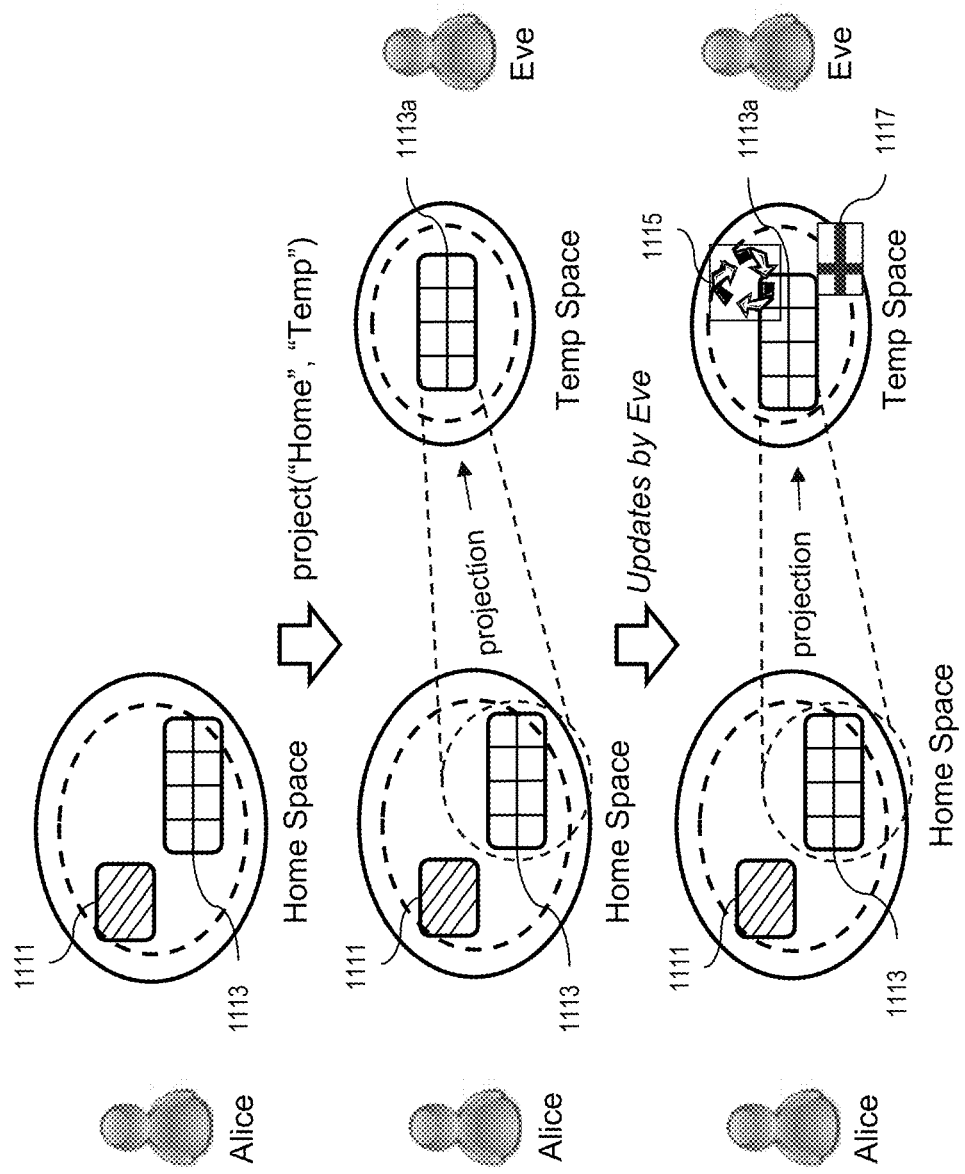
Figure 11D:
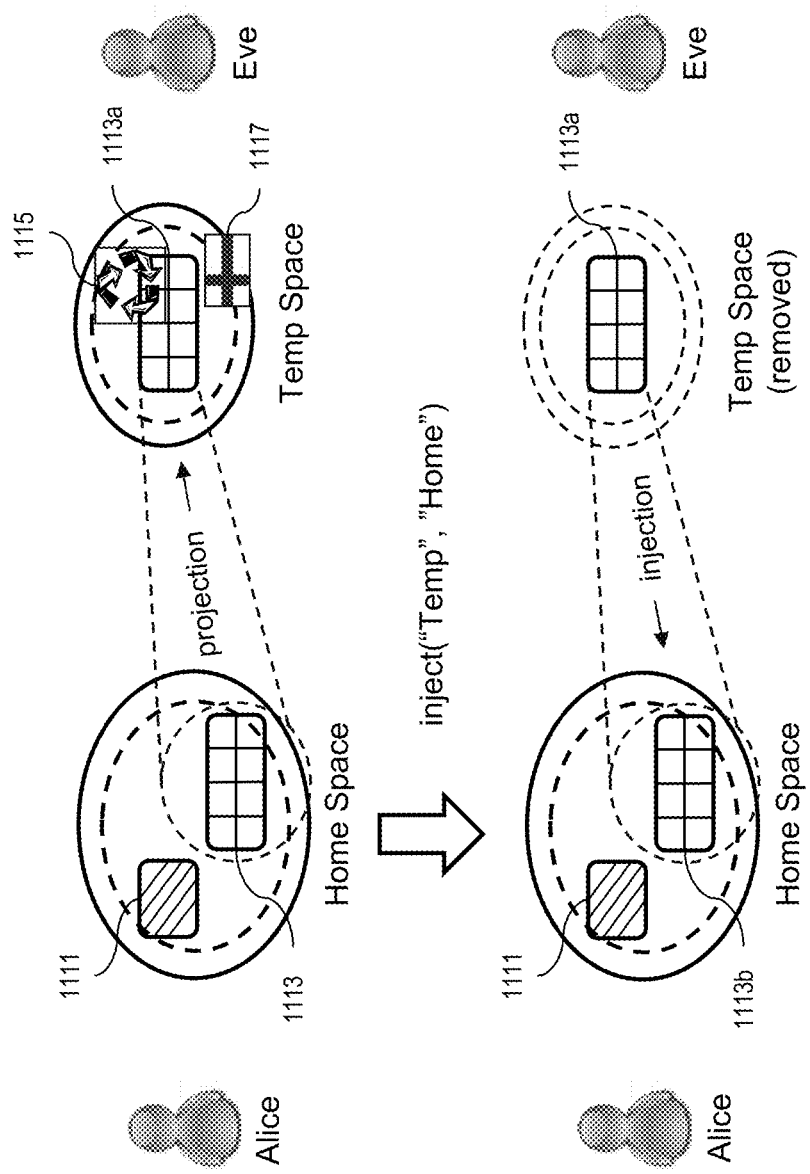

FIGS. 11A-11D are diagrams of example use cases for applying a split, merge, projection, and injection operation, respectively, on an information space, according to various embodiments. These use cases involves an assumption that the agents/applications executing on the users' devices have access to all the information in the spaces they are connected to at all times. In other words, the information spaces in the examples are ubiquitous in nature. FIGS. 11A and 11B present basic operations, while FIGS. 11C and 11D present extended scenarios utilizing historical information.

Some simple use cases for merge and split operations are based around copying and 'taking away' or 'borrowing' information. By way of example, two users, Alice and Bob, have their own information spaces while they have a home-space in which they share and store their information, contexts etc. During the day, Alice and Bob collect information such as contacts, calendar entries, photographs and everyday items, such as shopping lists. When they return home they can merge their local spaces' information with home's the larger combined information space. As seen in FIG. 11A, Alice has information 1101 and 1103 in her information space and home's information space contains information 1105. After Alice runs merge operation copying her information space into home's information space, her information space remains unchanged, but home-space now includes information 1101a (a copy of 1101) and 1103a (a copy of 1103), while it also maintains the information 1105 it already had.

Similarly in the scenario depicted in FIG. 11B, Bob may need to extract information from home-space and add it to his own information space. Bob may already have an information space or may be creating his information space for the first time. If Bob already has a personal information space then the operation of FIG. 11B involves the following steps. First, the process splits information from the home-space into a new temporary information space. Subsequently, this information space is merged with Bob's information space. The temporary information space can then be removed. In certain implementations, the combined application of "split-from-old" and "merge-with-existing" operation would appear as a single, atomic operation.

In FIG. 11B, a split operation is applied on home-space, for example, to extract Bob's preferred media collection of the day 1107. As shown in FIG. 11B, a copy of information 1107 is added to Bob's information space as 1107a (or Bob's information space is being created with filtered contents from the home-space) while home-space maintains its contents 1107 and 1109.

Another example is considered in FIG. 11C, which depicts a situation where, for example, Alice wishes to share a selection of photographs 1113 from the home-space with her friend Eve. Given that Alice may not necessarily wish to give Eve access to other information 1111 in her (and Bob's) home-space, she can project out a filtered selection of information 1113 as 1113a to a temporary information space for Eve to access. As seen in FIG. 11C, Eve can now interact with the temporary information space of information, while Alice can interact with the home-space. Propagation of Alice's updates into projected temporary information space continues while both users are interacting with the information spaces. In this way, if Alice adds, deletes or modifies information 1113, Eve will see the changes in 1113a. However, Eve's updates are not necessarily automatically injected back to home-space. As seen, Eve has added information 1115 and 1117 to the temporary information space and this information has not been injected in the home-space. While this could be automated, the basic operations discussed here need not take this into consideration and the injection of updated information into the original information space is considered to be part of any surrounding architecture and logic.

FIG. 11D depicts yet another example where the temporary information space provided to Eve in FIG. 11C is being injected back with filtering to the home-space. In FIG. 11D information 1113b is equivalent of 1113 with the changes applied by Eve on 1113a filtered out. In the meantime, to preserve the temporary information space, Eve might enact a split and merge similar to what described for Bob in FIG. 11B and transfer the information from temporary information space into her own information space. This of course will bring up the notion of data ownership. Since Eve is not the owner of shared information 1113a she may not be allowed to have them stored in her personal information space. However, issues such as security implications are considered to be dealt with at the implementation phase as part of the system architecture.

The above approaches, in certain embodiments, advantageously provide efficient data processing, while minimizing use of system resources (e.g., bandwidth, and processing). That is, users can issue queries, which can be answered expeditiously because of the management of the information space. In this manner, the user need not expend more resources and effort in locating desired information.

The processes described herein for merging, splitting, projecting and injecting information spaces may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
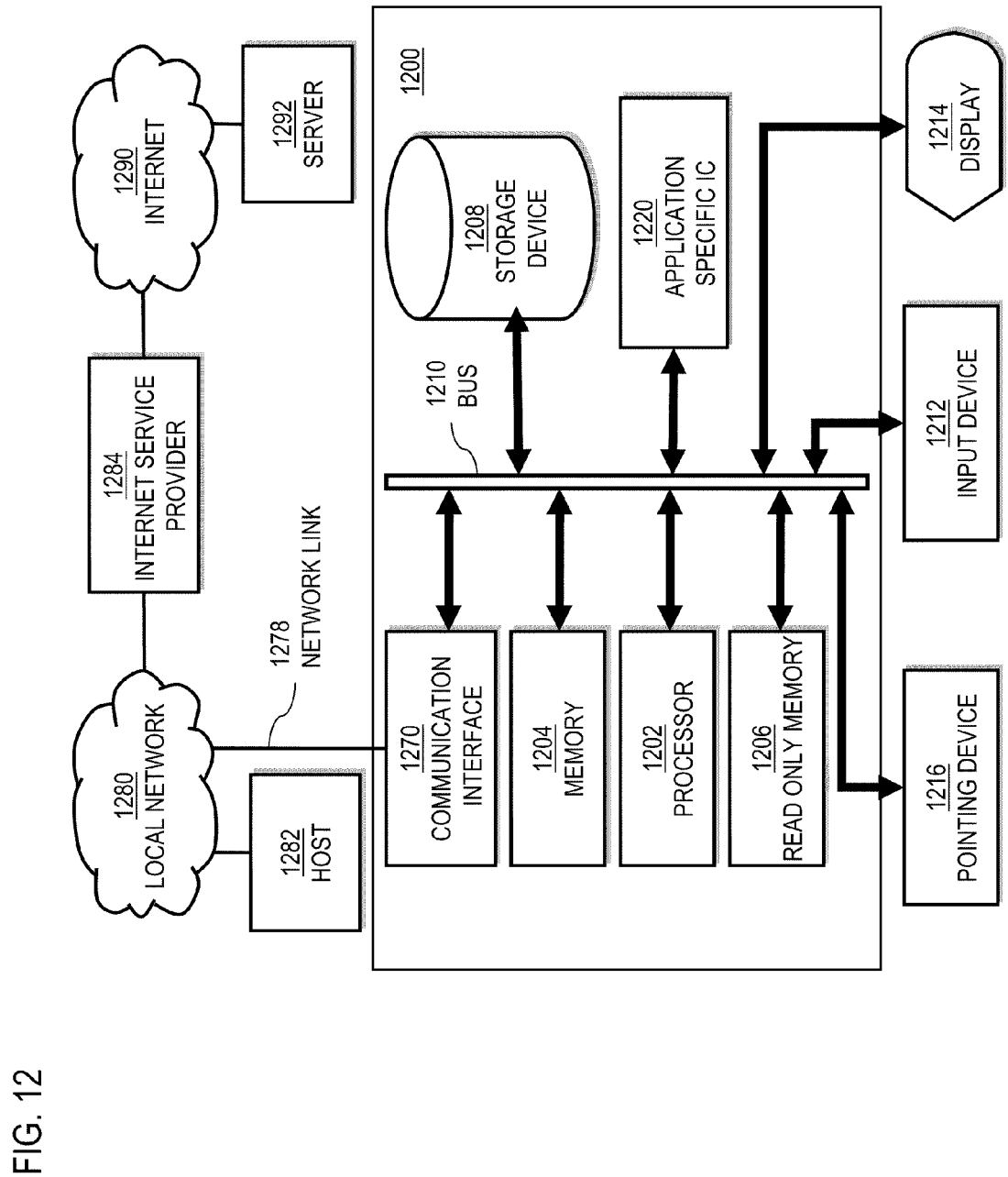
FIG. 12 is a diagram of hardware that can be used to implement an embodiment of the invention.

FIG. 12 illustrates a computer system 1200 upon which an embodiment of the invention may be implemented. Computer system 1200 is programmed (e.g., via computer program code or instructions) to create, store and maintain information spaces as well as applying various operations as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of creating, storing and maintaining information spaces as well as applying various operations.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to creating, storing and maintaining information spaces as well as applying various operations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for creating, storing and maintaining information spaces as well as applying various operations. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for creating, storing and maintaining information spaces as well as applying various operations, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 103 for creating, storing and maintaining information spaces as well as applying various operations. to the user devices 105a-105n.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290. A computer called a server host 1292 connected to the Internet hosts a process that provides a service in response to information received over the Internet. For example, server host 1292 hosts a process that provides information representing video data for presentation at display 1214.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

Figure 13:
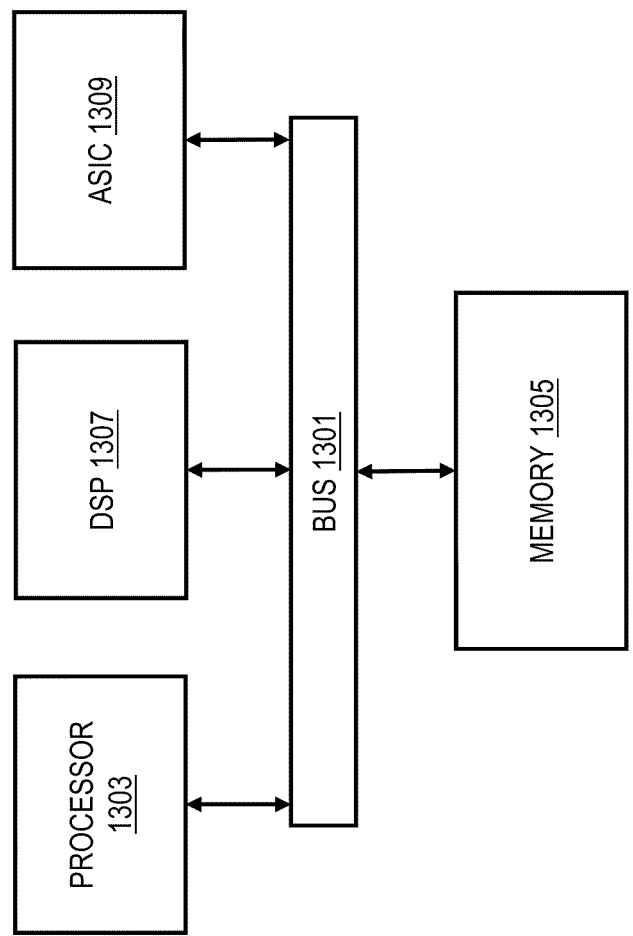
FIG. 13 is a diagram of a chip set that can be used to implement an embodiment of the invention.

FIG. 13 illustrates a chip set 1300 upon which an embodiment of the invention may be implemented. Chip set 1300 is programmed to create, store and maintain information spaces as well as apply various operations as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1300, or a portion thereof, constitutes a means for performing one or more steps of creating, storing and maintaining information spaces as well as applying various operations.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to create, store and maintain information spaces as well as apply various operations. The memory 1305 also stores the data associated with or generated by the execution of the inventive steps.

Figure 14:
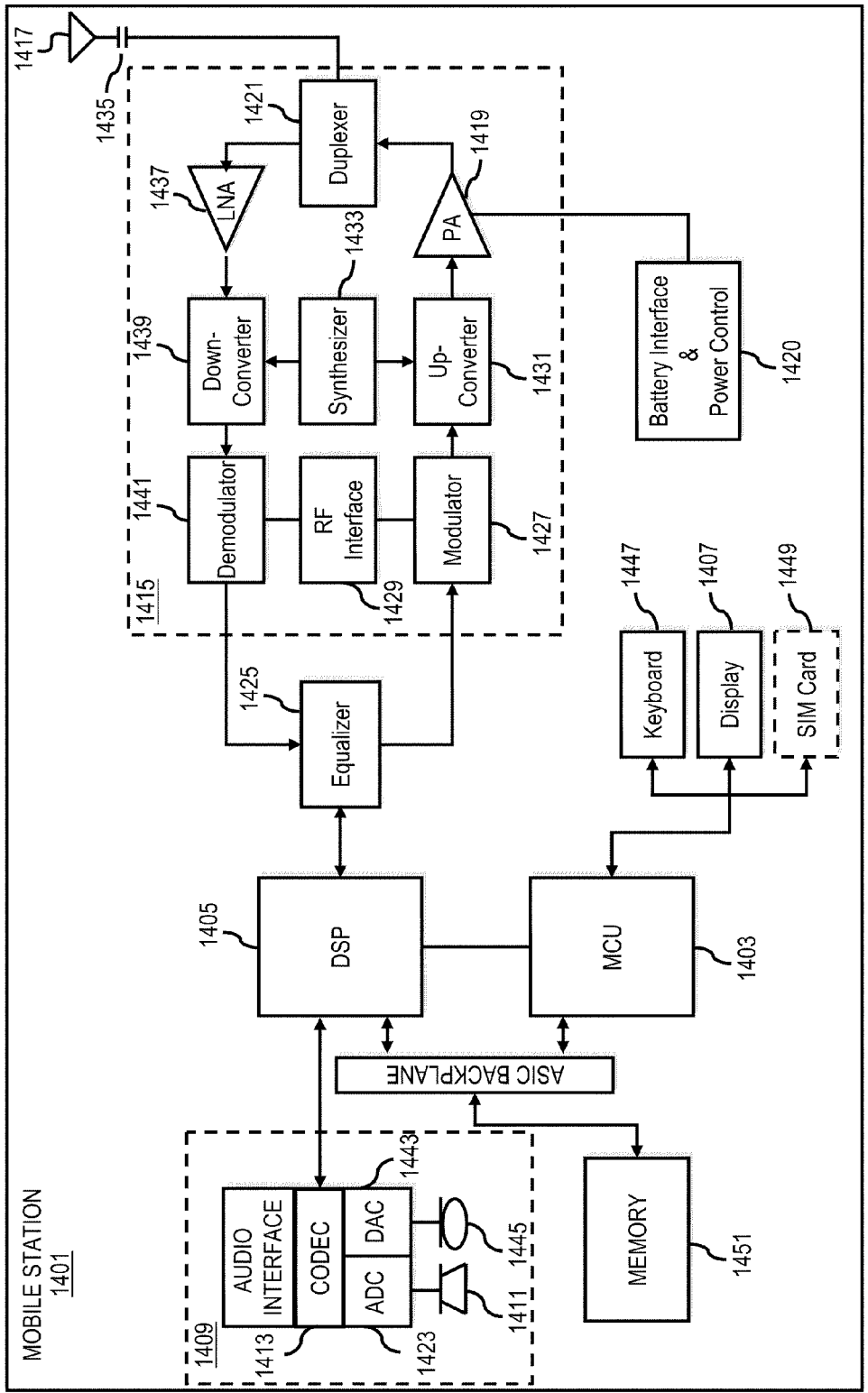
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1400, or a portion thereof, constitutes a means for performing one or more steps of creating, storing and maintaining information spaces as well as applying various operations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of creating, storing and maintaining information spaces as well as applying various operations. The display unit 1407 includes display circuitry configured to display at least a portion of a user interface of the mobile terminal (e.g., mobile telephone). Additionally, the display unit 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to create, store and maintain information spaces as well as apply various operations. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a query to inject a first information space into a second information space;
   determining whether the first information space and the second information space exist;
   determining whether the first information space is on a list of information spaces projected from the second information space, if the first and the second information spaces exist;
   applying a filtering function on information content of the first information space and any other information spaces projected from the first information space, if the first information space is on the list of information spaces projected from the second information space; and
   adding the filtered information content to the information content of the second information space.

2. A method of claim 1, wherein the filtering function operates on the information content of the first information space and any other information spaces projected from the first information space that has been added, deleted, or modified since projection of the first information space from the second information space.

3. A method of claim 1, wherein the filtering function is based on predefined criteria.

4. A method of claim 1 further comprising:
   removing the first information space from the list of information spaces projected from the second information space.

5. A method of claim 1 further comprising:
   modifying a history of the second information space based on injection of the first information space.

6. An apparatus comprising:
   at least one processor; and
   at least one memory including computer program code,
   the at least one memory and the computer program code configured to, with the at least one processor, cause the apparatus to perform at least the following,
      receive a query to inject a first information space into a second information space;
      determine whether the first information space and the second information space exist;
      determine whether the first information space is on a list of information spaces projected from the second information space, if the first and the second information spaces exist;
      apply a filtering function on information content of the first information space and any other information spaces projected from the first information space, if the first information space is on the list of information spaces projected from the second information space; and
      add the filtered information content to the information content of the second information space.

7. An apparatus of claim 6, wherein the filtering function operates on the information content of the first information space and any other information spaces projected from the first information space that has been added, deleted, or modified since projection of the first information space from the second information space.

8. An apparatus of claim 6, wherein the filtering function is based on predefined criteria.

9. An apparatus of claim 6 wherein the apparatus is further caused to:
   remove the first information space from the list of information spaces projected from the second information space.

10. An apparatus of claim 6 wherein the apparatus is further caused to:
    modify a history of the second information space based on injection of the first information space.

\* \* \* \* \*